(12) United States Patent
Fukuhara et al.

(10) Patent No.: US 10,992,131 B2
(45) Date of Patent: Apr. 27, 2021

(54) POWER SUPPLY SYSTEM AND POWER SUPPLY APPARATUS

(71) Applicant: Yokogawa Electric Corporation, Musashino (JP)

(72) Inventors: Kei Fukuhara, Musashino (JP); Iwao Nakanishi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/814,400

(22) Filed: Mar. 10, 2020

(65) Prior Publication Data
US 2020/0303922 A1 Sep. 24, 2020

(30) Foreign Application Priority Data
Mar. 20, 2019 (JP) ............................. JP2019-053174

(51) Int. Cl.
| | | |
|---|---|---|
| H02J 1/10 | (2006.01) | |
| H02J 1/12 | (2006.01) | |
| H02M 1/00 | (2006.01) | |
| H02M 3/156 | (2006.01) | |

(52) U.S. Cl.
CPC ................. H02J 1/12 (2013.01); H02M 1/00 (2013.01); H02M 3/156 (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 6,301,133 B1 | 10/2001 | Cuadra et al. | |
| 6,438,007 B1 | 8/2002 | Pilukaitis et al. | |
| 7,541,793 B2 * | 6/2009 | Saeueng | H02M 3/1584 323/284 |
| 7,928,704 B2 * | 4/2011 | Huang | H02M 3/1584 323/271 |
| 10,340,801 B2 * | 7/2019 | Johnson | H03B 5/08 |
| 2008/0062730 A1 | 3/2008 | Wirtzberger et al. | |
| 2011/0107122 A1 | 5/2011 | Wang et al. | |
| 2018/0367050 A1 | 12/2018 | Mnich | |

FOREIGN PATENT DOCUMENTS

| | | |
|---|---|---|
| CN | 106533142 A | 3/2017 |
| JP | 8-289468 A | 11/1996 |

* cited by examiner

*Primary Examiner* — Jeffery S Zweizig
(74) *Attorney, Agent, or Firm* — Sughrue Mion, PLLC

(57) ABSTRACT

A power supply system includes at least two power supply apparatuses that supply current to one load. Each power supply apparatus includes a converter that supplies current to the load, a FET connected in series between the converter and the load, a current detection unit that detects current flowing between the converter and the load, and a droop characteristic controller that causes output voltage of the converter to droop at a droop rate determined based on the magnitude of load current flowing from the converter towards the load. The droop rate is greater when the load current is included in a first current section than when the load current is included in each of a second current section and a third current section. The second current section includes smaller current than the first current section. The third current section includes larger current than the first current section.

20 Claims, 10 Drawing Sheets

POWER SUPPLY SYSTEM AND POWER SUPPLY APPARATUS

CROSS-REFERENCE TO RELATED APPLICATION

The present application claims priority to and the benefit of Japanese Patent Application No. 2019-53174 filed Mar. 20, 2019, the entire contents of which are incorporated herein by reference.

TECHNICAL FIELD

The present disclosure relates to a power supply system and a power supply apparatus.

BACKGROUND

An example of a known power supply apparatus used in a redundant power supply reduces the output voltage as the current outputted to the load increases. For example, see patent literature (PTL) 1.

CITATION LIST

Patent Literature

PTL 1: JPH8-289468A

SUMMARY

A power supply system according to an embodiment includes at least two power supply apparatuses that supply current to one load. Each power supply apparatus includes a converter that supplies current to the load, a FET connected in series between the converter and the load, a current detection unit that detects current flowing between the converter and the load, and a droop characteristic controller that causes output voltage of the converter to droop at a droop rate determined based on the magnitude of load current flowing from the converter towards the load. The droop rate when the load current is included in a first current section is greater than the droop rate when the load current is included in each of a second current section and a third current section. The second current section includes current that is smaller than current included in the first current section. The third current section includes current that is larger than the current included in the first current section.

A power supply apparatus according to an embodiment includes a converter that supplies current to a load, a FET connected in series between the converter and the load, a current detection unit that detects current flowing between the converter and the load, and a droop characteristic controller that causes output voltage of the converter to droop at a droop rate determined based on the magnitude of load current flowing from the converter towards the load. The droop rate when the load current is included in a first current section is greater than the droop rate when the load current is included in each of a second current section and a third current section. The second current section includes current that is smaller than current included in the first current section. The third current section includes current that is larger than the current included in the first current section.

DETAILED DESCRIPTION

Figure 1:
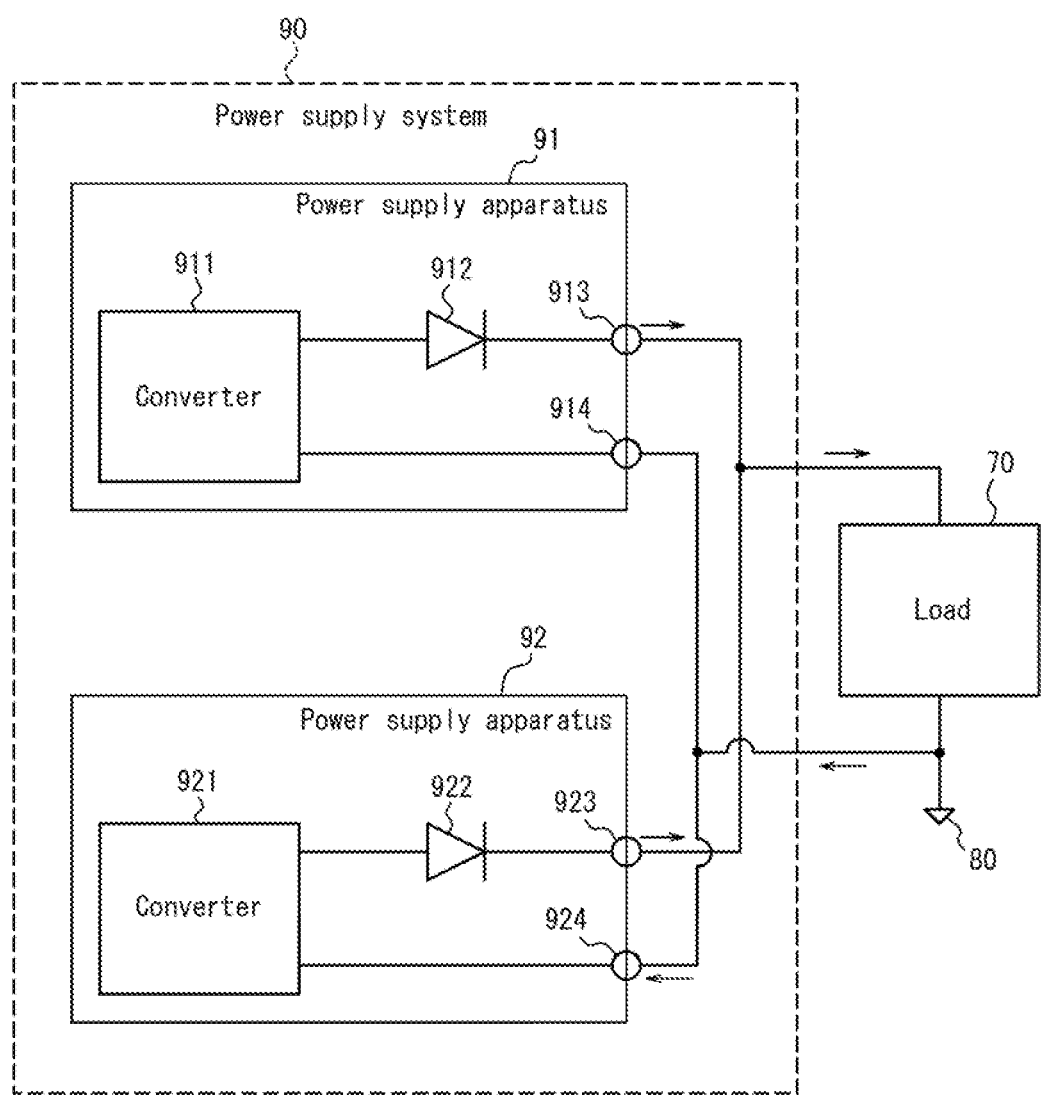
FIG. 1 is a circuit diagram illustrating a power supply system according to a first comparative example.

When a redundant power supply is configured by the power supply apparatus disclosed in PTL 1, the outputs of two power supply apparatuses are directly combined. If one of the power supply apparatuses suffers a short-circuit failure, the voltage supplied to the load might lower.

A power supply system according to an embodiment includes at least two power supply apparatuses that supply current to one load. Each power supply apparatus includes a converter that supplies current to the load, a FET connected in series between the converter and the load, a current detection unit that detects current flowing between the converter and the load, and a droop characteristic controller that causes output voltage of the converter to droop at a droop rate determined based on the magnitude of load current flowing from the converter towards the load. The droop rate when the load current is included in a first current section is greater than the droop rate when the load current is included in each of a second current section and a third current section. The second current section includes current that is smaller than current included in the first current section. The third current section includes current that is larger than the current included in the first current section. The load current is easier to balance when the droop rate is thus increased in a predetermined current section. Consequently, the reliability of the power supply system increases.

In a power supply system according to an embodiment, each power supply apparatus may further include a reverse current limitation unit that limits, based on a reverse current reference limit, a reverse current flowing from the load towards the converter. If one power supply apparatus suffers a short-circuit failure, this configuration reduces the probability of chain-reaction suspension of other operating power supply apparatuses. Consequently, the reliability of the power supply system increases.

In a power supply system according to an embodiment, the reverse current limitation unit may include a separation unit that inputs, to a gate of the FET, a signal based on the result of comparing the reverse current as detected by the current detection unit with the reverse current reference limit. The reverse current is limited by this configuration to be within a predetermined value. Consequently, the reliability of the power supply system increases.

In a power supply system according to an embodiment, the reverse current limitation unit may include a voltage monitor that inputs, to the gate of the FET, a signal based on the result of comparing the potential of the drain of the FET with the sum of the potential of the source of the FET and a monitoring offset voltage. The FET is cut off in this configuration when the reverse current exceeds a predetermined value. Consequently, the loss at the FET due to reverse current becomes nearly zero.

In a power supply system according to an embodiment, the converter may have a rated current. The rated current may be set to a larger value than the sum of the maximum load current and the reverse current reference limit. If reverse current flows in one power supply apparatus, this configuration reduces the probability of chain-reaction suspension of other operating power supply apparatuses. Consequently, the reliability of the power supply system increases.

In a power supply system according to an embodiment, a resistance element may be connected in series in at least one of paths short-circuiting between a current path from the converter towards the load and a ground point. This configuration limits short-circuit current flowing due to a short-circuit failure inside the power supply apparatus. Consequently, the reliability of the power supply system increases.

In a power supply system according to an embodiment, the first current section may include a current that is 50% of the maximum load current. This configuration balances the current outputted by each power supply apparatus when two power supply apparatuses are connected to the load. Balanced current reduces the difference in the amount of heat generated inside each power supply apparatus. The difference in lifespan of components in each power supply apparatus thereby reduces, increasing the reliability of the power supply system.

In a power supply system according to an embodiment, the droop rate when the load current is included in a fourth current section may be greater than the droop rate when the load current is included in each of a fifth current section and the third current section, the fourth current section may include current that is larger than current included in the third current section, the fifth current section may include current that is larger than current included in the fourth current section, the first current section may include current represented by the product of the maximum load current and the inverse of a first predetermined number, and the fourth current section may include current represented by the product of the maximum load current and the inverse of a second predetermined number yielded by subtracting one from the first predetermined number. The currents outputted by operating power supply apparatuses are easier to balance with this configuration, both when all of the first predetermined number of power supply apparatuses connected to the load are operating and when one of the power supply apparatuses has failed. Consequently, the reliability of the power supply system increases.

A power supply apparatus according to an embodiment includes a converter that supplies current to a load, a FET connected in series between the converter and the load, a current detection unit that detects current flowing between the converter and the load, and a droop characteristic controller that causes output voltage of the converter to droop at a droop rate determined based on the magnitude of load current flowing from the converter towards the load. The droop rate when the load current is included in a first current section is greater than the droop rate when the load current is included in each of a second current section and a third current section. The second current section includes current that is smaller than current included in the first current section. The third current section includes current that is larger than the current included in the first current section. The load current is easier to balance when the droop rate is thus increased in a predetermined current section. Consequently, the reliability of the power supply apparatus increases.

The present disclosure provides a power supply system and a power supply apparatus that are highly reliable.

Embodiments of the present disclosure are described while being compared to comparative examples.

COMPARATIVE EXAMPLE

First Comparative Example

As illustrated in FIG. 1, a power supply system 90 according to a first comparative example includes a power supply apparatus 91 and a power supply apparatus 92. The power supply apparatus 91 includes a converter 911, a redundancy diode 912, an output terminal 913, and a ground terminal 914. The power supply apparatus 92 includes a converter 921, a redundancy diode 922, an output terminal 923, and a ground terminal 924. Matter that is common to the power supply apparatuses 91, 92 is described only with respect to the power supply apparatus 91.

The power supply apparatuses 91, 92 are connected to a load 70 in parallel. One terminal of the load 70 is connected to the output terminals 913, 923. The other terminal of the load 70 is connected to a ground point 80 and to the ground terminals 914, 924. The power supply system 90 supplies the load 70 with the current yielded by combining the current outputted by the power supply apparatus 91 from the output terminal 913 and the current outputted by the power supply apparatus 92 from the output terminal 923. The current supplied to the load 70 may flow to the ground point 80 or may return to the power supply apparatuses 91, 92 through the ground terminals 914, 924.

The redundancy diodes 912, 922 are assumed to be Schottky barrier diodes with a small forward voltage drop. The power supply apparatuses 91, 92 are connected to the load 70 in parallel via the redundancy diodes 912, 922. The redundancy diode 912 prevents current from flowing from the output terminal 913 towards the converter 911. The redundancy diode 922 prevents current from flowing from the output terminal 923 towards the converter 921.

The converter 911 controls voltage between the output terminal 913 and the ground terminal 914. The converter 921 controls voltage between the output terminal 923 and the ground terminal 924. By controlling the voltage of the output terminals 913 and 923, the converters 911 and 921 can supply the current required by the load 70 while balancing the magnitude of the current provided by each of the power supply apparatuses 91, 92 to the load 70.

If one of the power supply apparatuses 91, 92 stops due to failure or the like, then the other power supply apparatus supplies all of the current required by the load 70. For example, when the power supply apparatus 91 stops, then the power supply apparatus 92 supplies all of the current required by the load 70. Consequently, even if one of the power supply apparatuses 91, 92 stops, the power supply system 90 overall can maintain the supply of power to the load 70. In other words, the power supply system 90 is redundant. In this case, each of the power supply apparatuses 91, 92 needs to be capable of supplying all of the current required by the load 70.

When the power supply apparatus 91 is connected to the load 70 via the redundancy diode 912, as in the power supply system 90, then loss increases at the redundancy diode 912. For example, when the forward voltage drop of the redundancy diode 912 is 0.4 volts (V), then a current of 10 amperes (A) provided to the load 70 generates a loss of up to 4 watts (W) at the redundancy diode 912. The power supply apparatus 91 needs to include a heat dissipation member, such as a large heatsink, in this case. The heat dissipation member prevents the power supply apparatus 91 from being reduced in size. Furthermore, the heat generated at the redundancy diode 912 raises the temperature of electronic components such as an electrolytic capacitor, thereby shortening the lifespan of the electronic components. Consequently, the reliability of the power supply apparatus 91 decreases.

The power supply apparatus 91 controls the voltage of the stage prior to the redundancy diode 912. In this case, the redundancy diode 912 is located outside of the feedback loop of the feedback control by the power supply apparatus 91. The converter 911 therefore cannot compensate for the current-voltage characteristics or temperature characteristics of the redundancy diode 912, nor for individual variation in these characteristics. The inability to compensate for the characteristics of the redundancy diode 912 increases the error of the voltage outputted by the power supply apparatus 91. Consequently, it is difficult for the power supply apparatus 91 that includes the redundancy diode 912 to control the voltage. In other words, the voltage regulation characteristics of the power supply apparatus 91 that includes the redundancy diode 912 are poor.

The forward voltage drop of the redundancy diode 912 typically has negative temperature characteristics. For example, in a Schottky barrier diode with a forward voltage drop of approximately 0.4 V, the difference in the forward voltage drop between the low temperature environment and the high temperature environment might be approximately 0.2 V to 0.3 V. When the power supply apparatus 91 outputs a voltage of 5 V, for example, and the forward voltage drop changes by 0.2 V to 0.3 V due to the temperature characteristics, then this change causes the output voltage also to change by 4% to 6%. The regulation standard for a typical power supply is roughly ±5%. Accordingly, it is difficult to satisfy the regulation standard in a power supply that includes an element causing the output voltage to change by 4% to 6%. To satisfy the regulation standard, it becomes necessary to use a trimmer resistor or the like for precise adjustment of the voltage setting. This precise adjustment raises manufacturing costs.

The higher the temperature of the redundancy diode 912, the more the forward voltage drop of the redundancy diode 912 decreases due to the negative temperature characteristics. This decrease in the forward voltage drop of the redundancy diode 912 increases the voltage outputted by the power supply apparatus 91. In turn, the increase in the voltage outputted by the power supply apparatus 91 increases the current outputted by the power supply apparatus 91 to the load 70. The increase in the current outputted by the power supply apparatus 91 raises the temperature of the redundancy diode 912. In this way, positive feedback may occur in the temperature of the redundancy diode 912. The current outputted by the power supply apparatus 91 to the load 70 and the current outputted by the power supply apparatus 92 to the load 70 therefore easily become imbalanced in the configuration that connects to the load 70 via the redundancy diodes 912, 922.

Second Comparative Example

The case of the power supply apparatuses 91, 92 not including the redundancy diodes 912, 922 is described as a second comparative example. In the second comparative example, the current-voltage characteristics of the power supply apparatuses 91, 92 exhibit a droop characteristic. The droop characteristic represents the characteristic whereby the outputted voltage decreases as the current outputted to the load 70 increases. When the power supply apparatuses 91, 92 are connected in parallel to the load 70, the droop characteristic makes it easier to balance the current outputted by each of the power supply apparatuses 91, 92 even though the redundancy diodes 912, 922 are not included. However, the lack of redundancy diodes 912, 922 means that if the power supply apparatus 91 suffers a short-circuit failure, for example, the current of the power supply apparatus 92 flows to the short-circuit point of the power supply apparatus 91. This leads to effects such as the current supplied from the power supply apparatus 92 to the load 70 becoming insufficient, or the voltage outputted by the power supply apparatus 92 decreasing. The power supply system 90 overall therefore becomes unable to maintain the supply of power to the load 70.

Third Comparative Example

A configuration in which each of the power supply apparatuses 91, 92 output current matching the current outputted by another apparatus is described as a third comparative example. In the third comparative example, the power supply apparatus 91 needs to include a circuit for detecting the current outputted by another apparatus and a circuit for controlling the outputted current based on the detected current. Such a configuration leads to increased apparatus cost.

Fourth Comparative Example

A configuration in which the power supply apparatuses 91, 92 include a micro control unit (MCU) is described as a fourth comparative example. In the fourth comparative example, one of the power supply apparatuses 91, 92 that are connected in parallel to the load 70 functions as a master, and the other functions as a slave. Based on the detected voltage and current outputted by each apparatus, the MCU of the apparatus functioning as the master outputs control information to the MCU of the apparatus functioning as the slave. This configuration allows the MCU to balance the current outputted by each apparatus and to reduce variation in the voltage. A configuration using an MCU, however, requires that each apparatus detect and communicate the outputted voltage and current. A program to operate the MCU is also required. Use of an MCU therefore leads to an increase in device cost.

SUMMARY

As described above, the configurations in the comparative examples have problems such as a difficulty in balancing the current outputted by the power supply apparatuses 91, 92 and vulnerability to short-circuit failure. These problems reduce the reliability of the power supply system 90 and the power supply apparatus 91.

The present disclosure therefore describes a highly reliable power supply apparatus and power supply system.

Embodiment of the Present Disclosure

Figure 2:
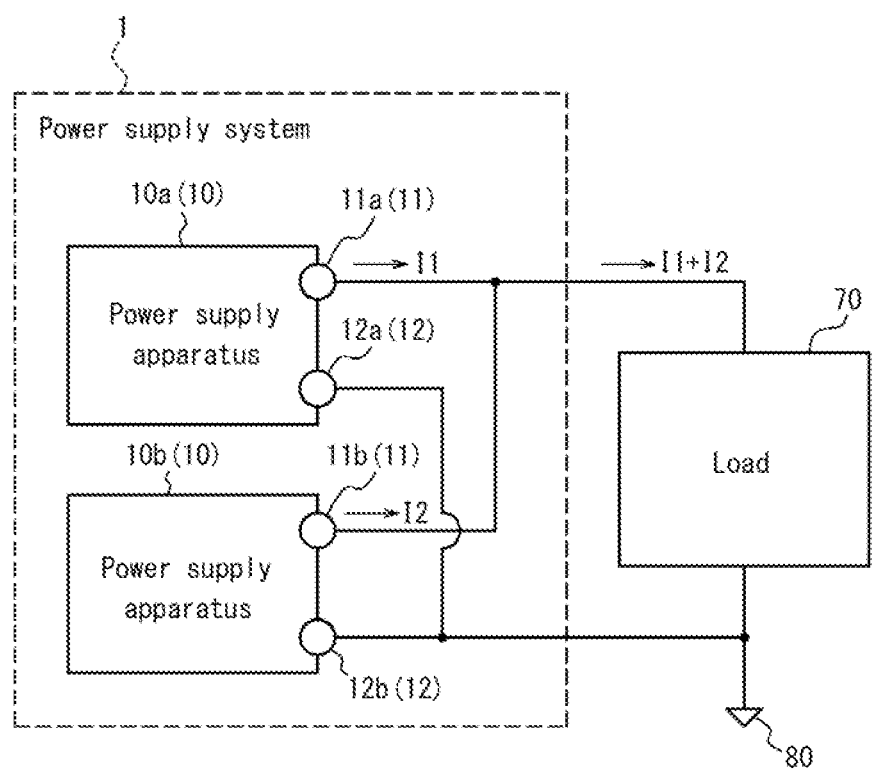
FIG. 2 is a block diagram illustrating an example configuration of a power supply system according to an embodiment.

As illustrated in FIG. 2, a power supply system 1 according to an embodiment includes power supply apparatuses 10a, 10b. The power supply apparatuses 10a, 10b are referred to as a power supply apparatus 10 when no distinction therebetween is necessary.

The power supply apparatus 10a includes an output terminal 11a and a ground terminal 12a. The power supply apparatus 10b includes an output terminal 11b and a ground terminal 12b. The output terminals 11a, 11b are referred to as an output terminal 11 when no distinction therebetween is necessary. The ground terminals 12a, 12b are referred to as a ground terminal 12 when no distinction therebetween is necessary.

The power supply apparatuses 10a, 10b are connected to a load 70 in parallel. One terminal of the load 70 is connected to the output terminals 11a, 11b. The other terminal of the load 70 is connected to a ground point 80 and to the ground terminals 12a, 12b. The current outputted by the power supply apparatus 10a from the output terminal 11a is represented as I1. The current outputted by the power supply apparatus 10b from the output terminal 11b is represented as I2. The power supply system 1 supplies the load 70 with the current yielded by combining the current outputted by the power supply apparatus 10a from the output terminal 11a and the current outputted by the power supply apparatus 10b from the output terminal 11b. In other words, the power supply system 1 provides the current represented as I1+I2 to the load 70. The current supplied to the load 70 may flow to the ground point 80 or may return to the power supply apparatuses 10a, 10b through the ground terminals 12a, 12b.

The present embodiment is described below assuming that two power supply apparatuses 10 are connected to the load 70 in parallel. Three or more power supply apparatuses 10 may instead be connected to the load 70 in parallel.

When the two power supply apparatuses 10 are connected in parallel to the load 70, and one power supply apparatus 10 fails, then the other power supply apparatus 10 supplies power to the load 70. The power supply system 1 overall thereby continues to supply power to the load 70. The current outputted by each power supply apparatus 10 when both power supply apparatuses 10 are operating normally may be controlled to be 50% of the current required by the load 70. The current required by the load 70 is thereby supplied from the two power supply apparatuses 10 in a balanced manner. The current outputted by each power supply apparatus 10 is referred to as the load current $I_L$. The maximum current required by the load 70 is referred to as the maximum load current. When the load 70 requires the maximum load current, each power supply apparatus 10 is controlled so that the sum of the load currents $I_L$ becomes the maximum load current. In the present embodiment, the load 70 is assumed to require the maximum load current.

Figure 3:
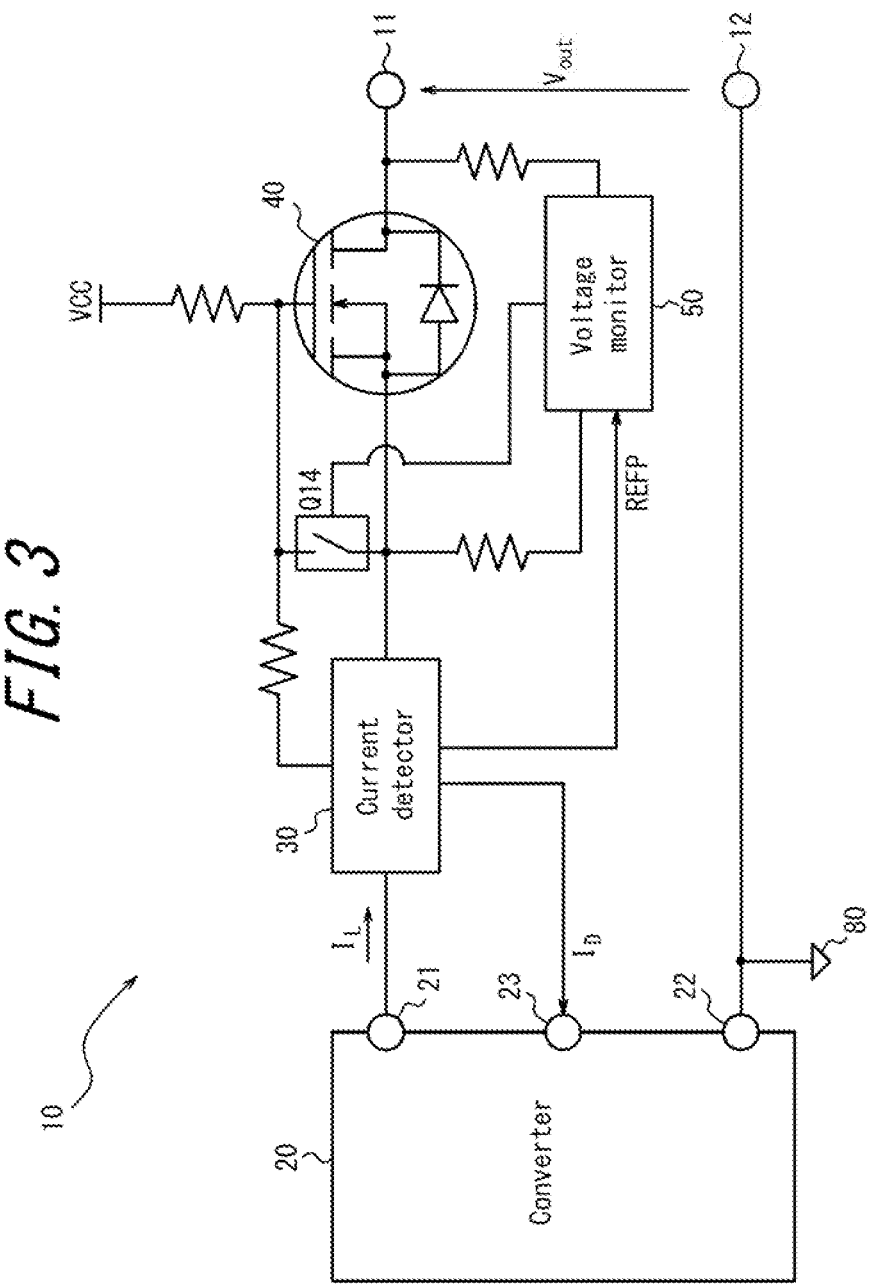
FIG. 3 is a block diagram illustrating an example configuration of a power supply apparatus according to an embodiment.

As illustrated in FIG. 3, the power supply apparatus 10 includes a converter 20, a current detector 30, a FET 40, and a voltage monitor 50.

The converter 20 includes a converter output terminal 21, a converter ground terminal 22, and a feedback terminal 23. The converter 20 outputs the load current $I_L$ from the converter output terminal 21 towards the output terminal 11. The current detector 30 and the FET 40 are connected in series between the converter output terminal 21 and the output terminal 11. The load current $I_L$ outputted from the converter output terminal 21 flows through the current detector 30 and the FET 40 and is outputted from the output terminal 11 to the load 70. In other words, the power supply apparatus 10 outputs the load current $I_L$ from the output terminal 11 that is connected to one terminal of the load 70.

The power supply apparatus 10 outputs an output voltage $V_{out}$ between the output terminal 11 and the ground terminal 12. The output voltage $V_{out}$ corresponds to the voltage yielded by subtracting the voltage drop due to the load current $I_L$ flowing through the current detector 30 and the FET 40 from the voltage outputted by the converter 20 between the converter output terminal 21 and the converter ground terminal 22. The voltage outputted by the converter 20 between the converter output terminal 21 and the converter ground terminal 22 is also referred to as the converter voltage $V_{CONV}$. The converter 20 controls the converter voltage $V_{CONV}$ based on a signal inputted to the feedback terminal 23.

The current detector 30 detects the load current $I_L$ flowing from the converter output terminal 21 to the output terminal 11. Based on the detected load current $I_L$, the current detector 30 generates a current signal $I_D$ to input to the feedback terminal 23. As described below, the converter 20 feeds the inputted current signal $I_D$ back to the control of the converter voltage $V_{CONV}$.

The FET 40 is driven by receiving power from the power supply, represented as VCC. Based on the signal outputted by the current detector 30, the FET 40 controls the current that flows between the converter output terminal 21 and the output terminal 11. The FET 40 is assumed to be an n-channel metal oxide silicon FET (MOSFET), but this example is not limiting. The FET 40 includes a body diode. The FET 40 is connected so that the forward direction of the body diode matches the direction in which the load current $I_L$ flows from the converter 20 towards the load 70. The FET 40 is also referred to as a redundancy FET.

The voltage monitor 50 detects the voltage across both ends of the FET 40. Based on the detection result, the voltage monitor 50 controls the opening and closing of a switching element Q14. When closed, the switching element Q14 creates a short circuit between the source and gate of the FET 40.

Figure 4:
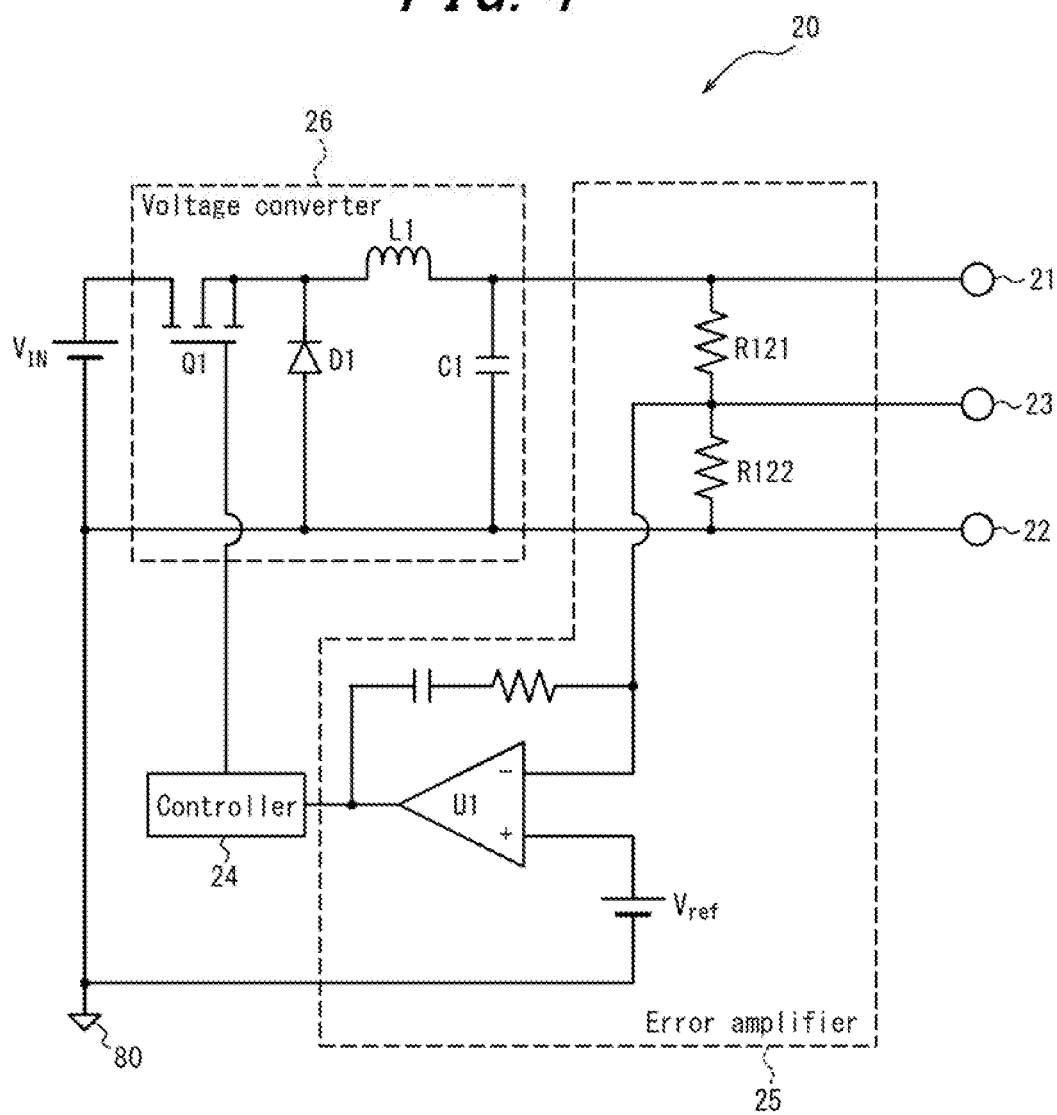
FIG. 4 is a block diagram illustrating an example configuration of a converter.

As illustrated in FIG. 4, the converter 20 includes a controller 24, an error amplifier 25, and a voltage converter 26. The converter 20 converts the power supplied from an external power supply $V_{IN}$ to direct current (DC) power identified by the load current $I_L$ and the converter voltage $V_{CONV}$.

The voltage converter 26 includes a switching element Q1, a diode D1, an inductor L1, and a capacitor C1. The switching element Q1 is assumed to be an n-channel MOSFET, but this example is not limiting. The drain of the switching element Q1 is connected to the external power supply $V_{IN}$. The external power supply $V_{IN}$ is represented as a DC power supply but may instead be an alternating current (AC) power supply. The source of the switching element Q1 is connected to the cathode of the diode D1 and one terminal of the inductor L1. The gate of the switching element Q1 is connected to the controller 24. The other terminal of the inductor L1 is connected to one terminal of the capacitor C1. The anode of the diode D1 and the other terminal of the capacitor C1 are connected to the ground point 80.

The switching element Q1 converts the voltage of the external power supply $V_{IN}$ to an AC signal by switching between being open and closed based on a control signal from the controller 24. The controller 24 may control the AC signal by a pulse width modulation (PWM) method or by another modulation method. The switching element Q1 is assumed to generate a PWM signal controlled by a PWM method.

The PWM signal is rectified by the diode D1 and is smoothed by the inductor L1 and the capacitor C1 to be converted to DC voltage having a predetermined voltage level. In other words, the voltage converter 26 forms a step-down switching power supply that steps down the voltage of the external power supply $V_{IN}$. As the duty ratio of the PWM signal is larger, the voltage level of the DC voltage outputted by the voltage converter 26 increases. The voltage converter 26 may be a boost switching power supply.

The node of the voltage converter 26 between the inductor L1 and the capacitor C1 is connected to the converter output terminal 21. The DC voltage outputted by the voltage converter 26 is outputted from the converter output terminal 21 as the converter voltage $V_{CONV}$.

The error amplifier 25 includes an operational amplifier U1, resistors R121, R122, and a reference power supply $V_{ref}$.

The resistors R121, R122 are connected in series between the converter output terminal 21 and the converter ground terminal 22. The node between the resistor R121 and the resistor R122 is connected to an inverting input terminal of the operational amplifier U1. The voltage of the node between the resistor R121 and the resistor R122 corresponds to a voltage yielded by dividing the converter voltage $V_{CONV}$. In other words, the voltage yielded by dividing the converter voltage $V_{CONV}$ is inputted to the inverting input terminal of the operational amplifier U1. The reference power supply $V_{ref}$ is connected to a non-inverting input terminal of the operational amplifier U1. The voltage of the reference power supply $V_{ref}$ is inputted to the non-inverting input terminal of the operational amplifier U1. The output terminal of the operational amplifier U1 is connected to the inverting input terminal of the operational amplifier U1 via a feedback circuit. The feedback circuit may include a resistor and a capacitor.

The output terminal of the operational amplifier U1 is connected to the controller 24. The operational amplifier U1 operates so that the voltage inputted to the inverting input terminal matches the voltage inputted to the non-inverting input terminal. The operational amplifier U1 outputs a signal, to the controller 24, for matching the voltage of the node between the resistor R121 and the resistor R122 to the voltage of the reference power supply $V_{ref}$.

Based on the output of the operational amplifier U1, the controller 24 outputs a control signal for controlling the opening and closing of the switching element Q1 to the gate of the switching element Q1. The controller 24 can control the converter voltage $V_{CONV}$ by using the PWM method to control the AC signal outputted by the switching element Q1. The controller 24 may include a processor such as a central processing unit (CPU). The controller 24 may control the converter voltage $V_{CONV}$ by executing a predetermined program.

When the current signal $I_D$ is not inputted to the feedback terminal 23, the converter 20 controls the converter voltage $V_{CONV}$ based on the voltage of the reference power supply $V_{ref}$. When the current signal $I_D$ is inputted to the feedback terminal 23, the current signal $I_D$ flows to the ground point 80 via the resistor R122. In other words, the current signal $I_D$ flows to the resistor R122 superimposed on current that is based on the converter voltage $V_{CONV}$. The current signal $I_D$ is also referred to as a superimposed current signal. The voltage of the node between the resistor R121 and the resistor R122 rises as a result of the superimposed current signal flowing to the resistor R122. As a result of the operations of the operational amplifier U1 and the controller 24, the converter voltage $V_{CONV}$ reduces as the current signal $I_D$ grows larger. The relationship between the load current $I_L$ and the converter voltage $V_{CONV}$ can be appropriately set by the current detector 30 determining the current signal $I_D$ based on the load current $I_L$, as described below.

Figure 5:
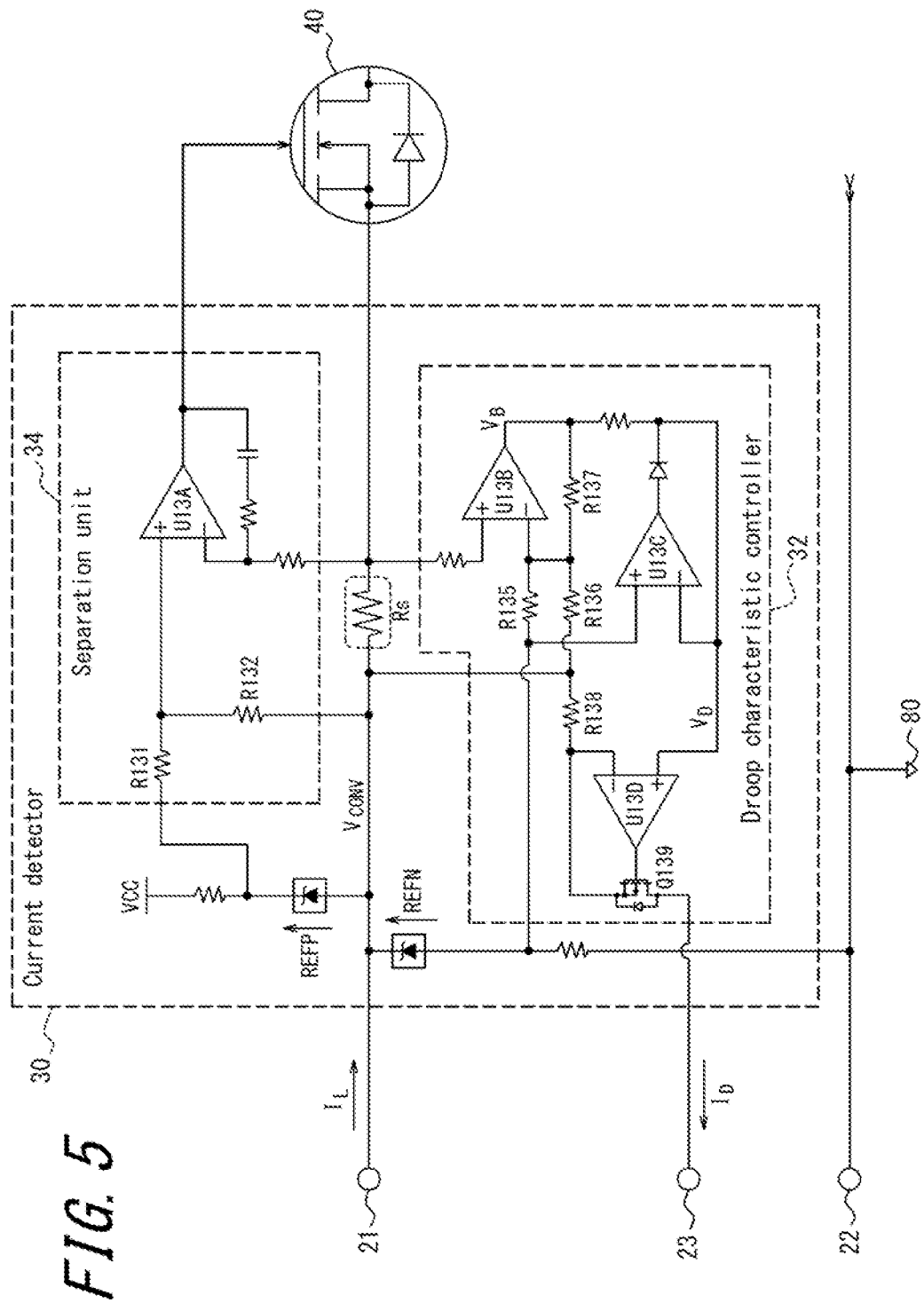
FIG. 5 is a block diagram illustrating an example configuration of a current detector.

As illustrated in FIG. 5, the current detector 30 includes a resistor Rs connected in series between the converter output terminal 21 and the FET 40. The resistor Rs detects the load current $I_L$. The resistor Rs is also referred to as a current detection unit. The sign of the load current $I_L$ is assumed to be positive when current flows from the converter output terminal 21 towards the FET 40.

The current detector 30 includes a droop characteristic controller 32. The droop characteristic controller 32 generates the current signal $I_D$ based on the voltage across both ends of the resistor Rs. The voltage across both ends of the resistor Rs corresponds to the magnitude of the voltage drop occurring due to the current flowing through the resistor Rs and is expressed as the product of Rs and $I_L$. The potential at the converter 20 side of the resistor Rs is expressed as $V_{CONV}$. The potential at the FET 40 side of the resistor Rs is expressed as $V_{CONV}-Rs\cdot I_L$. The potential at each end of the resistor Rs is expressed as the potential difference from the ground point 80.

The droop characteristic controller 32 includes operational amplifiers U13B, U13C, U13D, resistors R135, R136, R137, R138, a Zener diode REFN, and a switching element Q139.

The terminal of the resistor Rs on the FET 40 side is connected to a non-inverting input terminal of the operational amplifier U13B. The terminal of the resistor Rs on the converter 20 side is connected to the inverting input terminal of the operational amplifier U13B via the resistor R136 and is also connected to the inverting input terminal of the operational amplifier U13B via the Zener diode REFN and the resistor R135. In other words, the resistor R136 and the series connection circuit including the Zener diode REFN and the resistor R135 are connected in parallel between the terminal of the resistor Rs on the converter 20 side and the inverting input terminal of the operational amplifier U13B. The output terminal of the operational amplifier U13B is connected to the inverting input terminal of the operational amplifier U13B via the resistor R137.

The operational amplifier U13B controls output so that the voltage inputted to the inverting input terminal matches the voltage inputted to the non-inverting input terminal. In the example in FIG. 5, the operational amplifier U13B controls the output voltage $V_B$ of its output terminal to be the value represented by Expression (1) below.

$$V_B = V_{CONV} + R137/R135 \cdot REFN - Rs \cdot I_L \cdot [1 + R137/(R135//R136)] \quad (1)$$

Here, R135//R136 represents the parallel resistance between the resistor R135 and the resistor R136.

The operational amplifier U13C is connected to the Zener diode REFN and the operational amplifiers U13B, U13D and clamps the lower limit of the voltage inputted to the non-inverting input terminal of the operational amplifier U13D to a predetermined value. The non-inverting input terminal of the operational amplifier U13C is connected to the Zener diode REFN. The voltage inputted to the non-inverting input terminal of the operational amplifier U13C is represented by $V_{CONV}$–REFN. The inverting input terminal of the operational amplifier U13C is connected to the non-inverting input terminal of the operational amplifier U13D and is also connected to the output terminal of the operational amplifier U13C via a diode. In other words, the output terminal of the operational amplifier U13C is connected, via a diode, to the inverting input terminal of the operational amplifier U13C and the non-inverting input terminal of the operational amplifier U13D. The output terminal of the operational amplifier U13C is further connected to the output terminal of the operational amplifier U13B via a resistor. The diode connected to the output terminal of the operational amplifier U13C is connected so that current from the output terminal of the operational amplifier U13C flows in the forward direction. By being connected in this way, the operational amplifier U13C clamps the lower limit of the voltage inputted to the non-inverting input terminal of the operational amplifier U13D at $V_{CONV}$–REFN.

The operational amplifier U13D is connected to the operational amplifiers U13B, U13C, the resistor R138, and the switching element Q139. The switching element Q139 is assumed to be a p-channel MOSFET, but this example is not limiting. The operational amplifier U13D and the switching element Q139 generate a current signal $I_D$ based on the load current $I_L$. The non-inverting input terminal of the operational amplifier U13D is connected to the output terminals of the operational amplifiers U13B and U13C. The voltage inputted to the non-inverting input terminal of the operational amplifier U13D is designated VD. The inverting input terminal of the operational amplifier U13D is connected to the converter 20 side of the resistor Rs via the resistor R138 and also to the source of the switching element Q139. The output terminal of the operational amplifier U13D is connected to the gate of the switching element Q139. The drain of the switching element Q139 is connected to the feedback terminal 23 of the converter 20. The operational amplifier U13D controls the current signal $I_D$ that flows from the drain of the switching element Q139 to the feedback terminal 23. The current signal $I_D$ is controlled in three different ways, indicated by cases 1 to 3 below, based on the magnitude of the load current $I_L$.

(Case 1)

$$I_D = 0 \quad (2)$$

This is the case when the following expression holds.

$$I_L \leq R137 \cdot R136/[R135 \cdot R136 + R137 \cdot (R135+R136)] \times (REFN/Rs)$$

(Case 2)

$$I_D = \{Rs \times I_L \times [1+R137/(R135//R136)] - R137/R135 \times REFN\}/R138 \quad (3)$$

This is the case when the following expressions both hold.

$$I_L > R137 \cdot R136/[R135 \cdot R136 + R137 \cdot (R135+R136)] \times (REFN/Rs),$$

$$I_L \leq (R135+R137)/[(R135 \cdot R136 + R137 \cdot (R135+R136)] \times (REFN/Rs)$$

(Case 3)

$$I_D = REFN/R138 \quad (4)$$

This is the case when the following expression holds.

$$I_L > (R135+R137)/[(R135 \cdot R136 + R137 \cdot (R135+R136)] \times (REFN/Rs)$$

The value of the load current $I_L$ that differentiates between case 1 and case 2 is also referred to as a first threshold current. The value of the load current $I_L$ that differentiates between case 2 and case 3 is also referred to as a second threshold current. By Expression (2), the current signal $I_D$ is not outputted until the load current $I_L$ reaches the first threshold current. By Expression (3), the current signal $I_D$ increases as the load current $I_L$ increases while the load current $I_L$ is larger than the first threshold current but does not reach the second threshold current. By Expression (4), the current signal $I_D$ becomes constant once the load current $I_L$ exceeds the second threshold current.

The converter 20 controls the converter voltage $V_{CONV}$ based on the current signal $I_D$ inputted to the feedback terminal 23. The converter voltage $V_{CONV}$ decreases as the current signal $I_D$ increases. When the load current $I_L$ is in the range specified by case 1, the converter voltage $V_{CONV}$ does not decrease. When the load current $I_L$ is in the range specified by case 2, the amount of decrease in the converter voltage $V_{CONV}$ is larger as the load current $I_L$ increases. When the load current $I_L$ is in the range specified by case 3, the amount of decrease in the converter voltage $V_{CONV}$ becomes constant.

Figure 6:
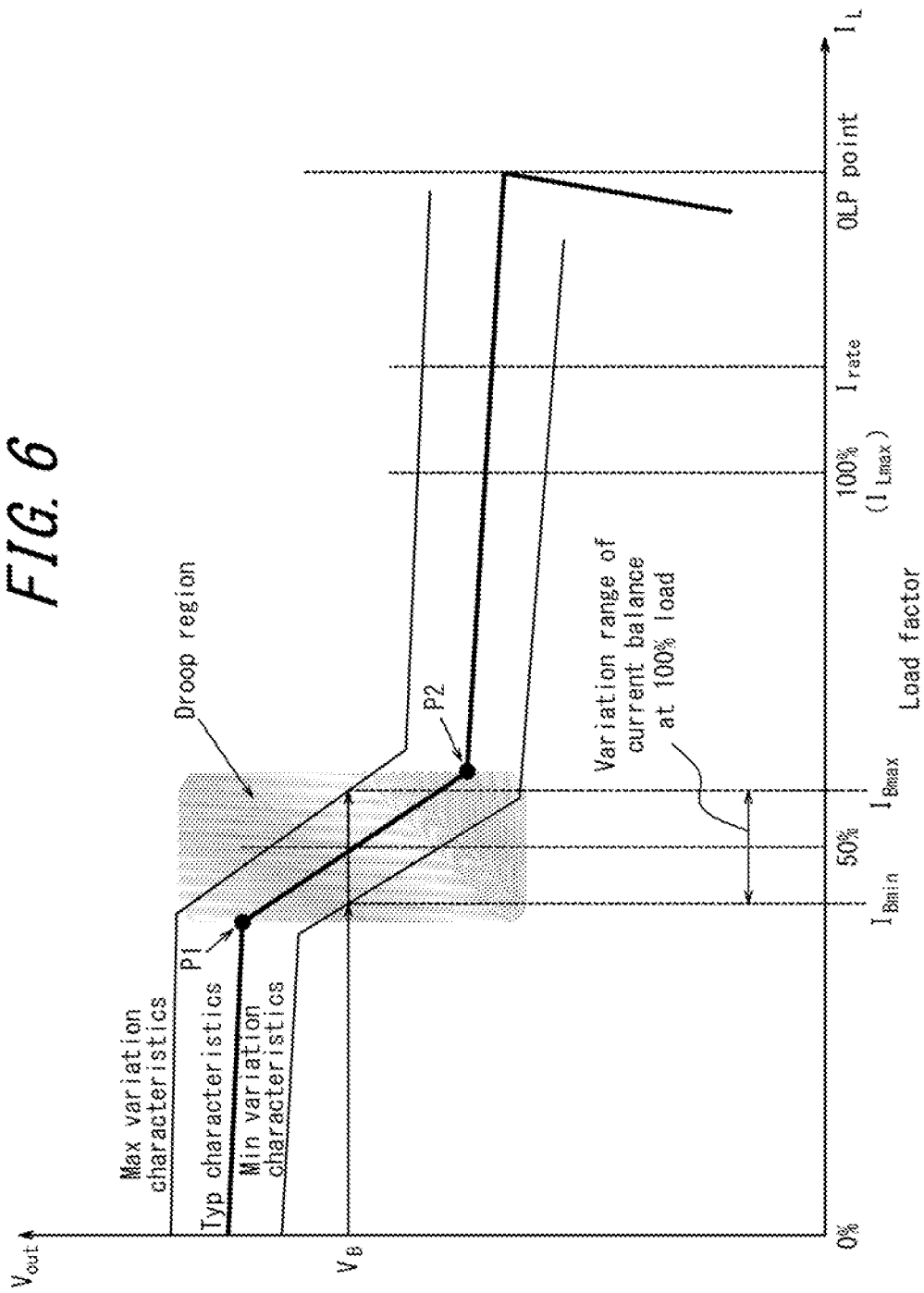
FIG. 6 is a graph illustrating an example of a droop characteristic of a power supply apparatus according to an embodiment.

Based on the relationship between the load current $I_L$ and the current signal $I_D$ identified by Expressions (2) to (4), the relationship between the load current $I_L$ and the output voltage $V_{out}$ is determined, for example as in the graph in FIG. 6. The horizontal axis represents the load current $I_L$, and the vertical axis represents the output voltage $V_{out}$ in the graph in FIG. 6. The plot labeled Typ characteristics represents typical current-voltage characteristics based on a configuration according to the present embodiment. The plots labeled Max variation characteristics and Min variation characteristics represent the assumed upper limit and lower limit on current-voltage characteristics within the possible range of variation exhibited by parameters such as FETs or operational amplifiers in the configuration according to the present embodiment. The plot labeled Typ characteristics is assumed below to represent the current-voltage characteristics according to the present embodiment.

A rated current is set as part of the specifications of the power supply apparatus 10. The rated current represents the upper limit of the current at which the power supply apparatus 10 can operate stably. In other words, operations of the power supply apparatus 10 are stable when the power supply apparatus 10 outputs current at or below the rated current. Conversely, operations of the power supply apparatus 10 may become unstable if the power supply apparatus 10 outputs current exceeding the rated current. The rated current is indicated by $I_{rate}$ on the horizontal axis of the graph in FIG. 6.

Even if one power supply apparatus 10 alone supplies current to the load 70, the upper limit of the load current $I_L$ of the power supply apparatus 10 is the maximum load current. In the power supply apparatus 10, the rated current is set to a larger value than the maximum load current. The rated current may be the same value as the maximum load current. The maximum load current is indicated by 100% ($I_{Lmax}$) on the horizontal axis of the graph in FIG. 6. The ratio of the load current $I_L$ to the maximum load current is also referred to as the load factor. The horizontal axis of the graph in FIG. 6 represents the value of the load current $I_L$ along with the load factor. Each power supply apparatus 10 is controlled so that the sum of the load currents $I_L$ becomes the maximum load current. For example, when two power supply apparatuses 10 are connected to the load 70 in parallel, and the load factor of one power supply apparatus 10 is 60%, then the load factor of the other power supply apparatus 10 is 40%.

As part of the specifications of the power supply apparatus 10, an overload protection (OLP) point is set for protecting the power supply apparatus 10 from overload. When the load current $I_L$ is greater than the OLP point, the power supply apparatus 10 executes an overload protection operation and suspends power supply to the load 70.

The plot representing the current-voltage characteristics according to the present embodiment (Typ characteristics in FIG. 6) includes a region in which the output voltage $V_{out}$ hardly changes despite an increase in the load current $I_L$ and a region in which the output voltage $V_{out}$ decreases as the load current $I_L$ increases. The region in which the output voltage $V_{out}$ decreases as the load current $I_L$ increases is also referred to as a droop region. The range of the droop region is represented by the shaded area. The droop characteristic controller 32 can be considered to cause the output voltage $V_{out}$ to droop in accordance with an increase in the load current $I_L$ in the droop region. The droop region and other regions may be distinguished between by the slope of the plot. The slope of the plot represents the rate of change in the output voltage $V_{out}$ relative to change in the load current $I_L$. The rate at which the output voltage $V_{out}$ reduces relative to an increase in the load current $I_L$ is also referred to as the droop rate. The absolute value of the slope of the plot in the droop region is greater than the slope of the plot in other regions. In other words, the output voltage $V_{out}$ decreases more in the droop region.

In FIG. 6, the slope of the plot changes suddenly at two locations. The point at which the slope first changes suddenly after the load current $I_L$ starts to increase from zero is represented as P1. The load current $I_L$ at P1 corresponds to the first threshold current. The point at which the load current $I_L$ becomes a larger value than the first threshold current and the slope suddenly changes for the second time is represented as P2. The load current $I_L$ at P2 corresponds to the second threshold current.

The horizontal axis of the graph in FIG. 6 is divided into a plurality of sections with the first threshold current and the second threshold current as boundaries. The section in which the current is larger than the first threshold current and smaller than the second threshold current is the section that identifies the droop region. This section is referred to as the first current section. The section in which the current is smaller than the first threshold current is referred to as the second current section. The section in which the current is larger than the second threshold current is referred to as the third current section. The second current section includes a current that is smaller than the current included in the first current section. The third current section includes a current that is larger than the current included in the first current section. The droop rate when the load current $I_L$ is included in the first current section can be considered greater than the droop rate when the load current $I_L$ is included in each of the second current section and the third current section.

In the present embodiment, the first threshold current is set to a smaller value than 50% of the maximum load current, but this example is not limiting. The first threshold current may be set to any value smaller than the second threshold current. The second threshold current is set to a larger value than 50% of the maximum load current, but this example is not limiting. The second threshold current may be set to any value larger than the first threshold current.

Figure 7:
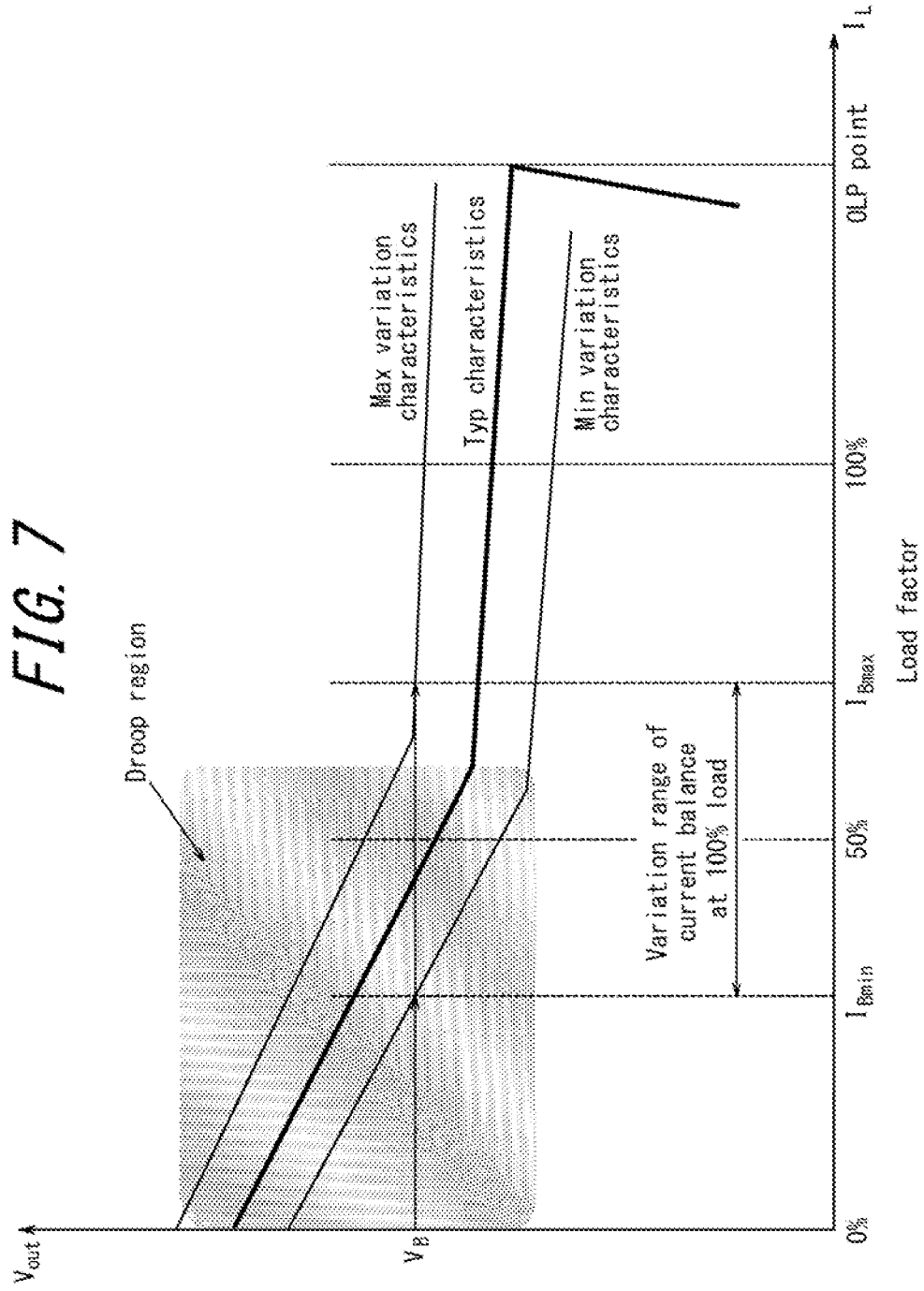
FIG. 7 is a graph illustrating an example of a droop characteristic of a power supply apparatus according to a second comparative example.

The graph in FIG. 7 represents the relationship between the load current $I_L$ and the output voltage $V_{out}$ in the above-described configuration of the second comparative example. The horizontal axis represents the load current $I_L$, and the vertical axis represents the output voltage $V_{out}$ in the graph in FIG. 7. The plot labeled Typ characteristics represents typical current-voltage characteristics in the second comparative example. The plots labeled Max variation characteristics and Min variation characteristics represent the assumed upper limit and lower limit on current-voltage characteristics within the possible range of variation exhibited by parameters such as FETs or operational amplifiers in the configuration according to the second comparative example. In the comparative example, the output voltage $V_{out}$ reduces in the plot labeled Typ characteristics once the load current $I_L$ begins to increase from zero. The slope of the plot changes suddenly at one point.

The load current $I_L$ outputted by each power supply apparatus 10 tends to be stable within the droop region when two power supply apparatuses 10 are connected to the load 70 in parallel. In the configuration of the second comparative example, the droop region includes the case of the load factor being 0%. The load factor of one power supply apparatus 10 in this case may stabilize at or near 0%, or may stabilize at 50%. If the load factor of one power supply apparatus 10 stabilizes at 10%, the load factor of the other power supply apparatus stabilizes at 90%. In other words, the load factor of the power supply apparatus 10 could become unstable in the configuration of the second comparative example. The droop region in the configuration according to the present embodiment, on the other hand, is limited to a load factor that is larger than the first threshold current and smaller than the second threshold current. In this case, the load factor of the power supply apparatus 10 is more stable than in the second comparative example. Consequently, the power supply apparatus 10 according to the present embodiment can improve the balance of the load currents $I_L$.

When the first threshold current is set to a value smaller than 50% of the maximum load current, and the second threshold current is set to a value larger than 50% of the maximum load current, then each of the two power supply apparatuses 10 is controlled to reduce the difference between the load currents $I_L$. In other words, it becomes easier to balance the load currents $I_L$ of the two power supply apparatuses 10.

$I_{Bmax}$ and $I_{Bmin}$ are indicated on the horizontal axis of the graphs in FIGS. 6 and 7. $I_{Bmax}$ represents the current flowing at the Max variation characteristics when $V_{out}=V_B$. $I_{Bmin}$ represents the current flowing at the Min variation characteristics when $V_{out}=V_B$. The current outputted by each power supply apparatus 10 falls between $I_{Bmax}$ and $I_{Bmin}$ when two power supply apparatuses 10 connected in parallel to the load 70 output current that is 100% of the maximum load current to the load 70. In other words, the difference between $I_{Bmax}$ and $I_{Bmin}$ represents the variation in the load factor of the power supply apparatus 10. The range from $I_{Bmin}$ to $I_{Bmax}$ is referred to as the variation range of current balance at 100% load. As the difference between $I_{Bmax}$ and $I_{Bmin}$ is smaller, the variation in the load factor of the power supply apparatus 10 is smaller. A small variation in the load factor makes it easier to improve the balance of the load currents $I_L$. The variation in the load factor within the current-voltage characteristics according to the present embodiment is smaller than the variation in the load factor within the current-voltage characteristics according to the second comparative example. Consequently, the power supply apparatus 10 according to the present embodiment can more easily improve the balance of the load currents $I_L$ than the second comparative example.

In the droop region of the graph in FIG. 6, the difference between $I_{Bmax}$ and $I_{Bmin}$ is smaller as the slope of the plot is sharper. In other words, the variation in the load factor can be made smaller as the droop rate is greater.

The variation in the amount of heat generated inside each power supply apparatus 10 can be reduced by the load factors of the two power supply apparatuses 10 being balanced. The more the amount of heat generation of the power supply apparatus 10 increases, the greater the decrease is in the lifespan of the aluminum electrolytic capacitor that follows the Arrhenius law, or the time until failure of components that have a lifespan, such as photo-couplers. Accordingly, the time until failure of at least one of the two power supply apparatuses 10 can be lengthened by the load factors of the two power supply apparatuses 10 being balanced. Consequently, the reliability of the power supply system 1 increases.

The power supply apparatus 10 according to the present embodiment includes the FET 40 instead of the redundancy diode 912 of the first comparative example. The loss due to the ON resistance of a FET is smaller than the loss due to the voltage drop of a diode. For example, if the ON resistance of the FET 40 is 5 mΩ, then the loss becomes 0.5 W when the load current $I_L$ is 10 A. On the other hand, if the voltage drop at the redundancy diode 912 of the first comparative example is 0.4 V, then the loss becomes 4 W when the current outputted by the power supply apparatus 91 is 10 A. The power supply apparatus 10 according to the present embodiment can, in other words, reduce loss by including the FET 40. The reduction in loss makes heat dissipation components, such as a heatsink, unnecessary and also leads to an improvement in reliability. Consequently, a reduction in size and an improvement in reliability of the power supply apparatus 10 can be achieved.

The ON resistance of the FET 40 in the present embodiment is low, which lowers the voltage drop at the FET 40. In other words, even when the output voltage $V_{out}$ is controlled based on the result of detecting the voltage of the stage prior to the FET 40, the regulation characteristics of the voltage of the stage subsequent to the FET 40 are not easily affected by the voltage drop. Even if the ON resistance of the FET 40 changes based on temperature characteristics, or if the ON resistance exhibits variation due to individual differences between FETs 40, the change in the output voltage $V_{out}$ caused by these factors is smaller than the change in the output voltage $V_{out}$ caused by the temperature characteristics of the redundancy diode 912. A small change in the output voltage $V_{out}$ makes it easier for the regulation of the output voltage $V_{out}$ to satisfy standards. Consequently, adjustment of the output voltage $V_{out}$ at the time of assembly of the power supply apparatus 10 can be omitted. Manufacturing costs can thereby be reduced.

The ON resistance of the FET 40 typically has positive temperature characteristics. The redundancy diode 912 of the first comparative example has negative temperature characteristics, causing positive feedback with respect to an increase in the current outputted by the power supply apparatus 91. This tends to destabilize or worsen the load balance. In the power supply apparatus 10 according to the present embodiment, the ON resistance of the FET 40 has positive temperature characteristics, causing negative feedback with respect to an increase in the load current $I_L$. Consequently, the load balance tends to be stable.

The current detector 30 includes a separation unit 34, as illustrated in FIG. 5. The separation unit 34 includes an operational amplifier U13A, resistors R131, R132, and a Zener diode REFP. When the power supply apparatus 10 is operating normally, the load current $I_L$ flows from the converter 20 towards the FET 40. In this case, the potential of the resistor Rs on the converter 20 side is higher than the potential of the resistor Rs on the FET 40 side.

If a short-circuit failure occurs inside the converter 20, and the FET 40 is on, then current would flow to the resistor Rs from the FET 40 towards the converter 20. In this case, the potential of the resistor Rs on the converter 20 side is lower than the potential of the resistor Rs on the FET 40 side.

A non-inverting input terminal of the operational amplifier U13A is connected to the cathode side of the Zener diode REFP via the resistor R131 and is connected to the converter 20 side of the resistor Rs via the resistor R132. The voltage inputted to the non-inverting input terminal of the operational amplifier U13A is the result of adding, to $V_{CONV}$, the voltage of the Zener diode REFP divided at the resistors R131, R132. The inverting input terminal of the operational amplifier U13A is connected to the FET 40 side of the resistor Rs. The voltage inputted to the inverting input terminal of the operational amplifier U13A is $V_{CONV}$–Rs·$I_L$. The output terminal of the operational amplifier U13A is connected to the inverting input terminal via a feedback circuit that includes a resistor and a capacitor and is connected to the gate of the FET 40.

When the power supply apparatus 10 is operating normally, the voltage inputted to the non-inverting input terminal of the operational amplifier U13A is higher than the voltage inputted to the inverting input terminal. Accordingly, the output of the operational amplifier U13A reaches its maximum positive value, which turns the FET 40 on. If a short-circuit failure occurs inside the converter 20, the operational amplifier U13A limits the current flowing from the FET 40 towards the converter 20 to be a predetermined value or less. The current flowing from the FET 40 to the converter 20 is also referred to as reverse current. The upper limit of the reverse current controlled by the operational amplifier U13A is referred to as the reverse current limit $I_{bk}$. The sign of $I_{bk}$ is negative when current flows from the FET 40 towards the converter 20. $I_{bk}$ is represented by Expression (5) below based on how the non-inverting input terminal and the inverting input terminal of the operational amplifier U13A form a virtual short.

$$I_{bk} = [-REFP \times R132/(R131+R132)]/Rs \quad (5)$$

The operational amplifier U13A can limit the reverse current to be $I_{bk}$ or less by controlling the voltage between the gate and source of the FET 40. If the cause of reverse current flowing to the resistor Rs is temporary, it is required that the FET 40 return to the on state when the cause is resolved. The FET 40 turns on automatically in the configuration whereby the operational amplifier U13A limits the reverse current.

If the absolute value of $I_{bk}$ is excessively large, then when reverse current flows to one power supply apparatus 10, the other power supply apparatus 10 needs to output a current yielded by combining the load current $I_L$ and the reverse current. Accordingly, the sum of the absolute value of the $I_{bk}$ and the maximum load current needs to be equal to or less than the rated current. This relationship is represented as Expression (6) below.

$$|I_{bk}| + I_{Lmax} \leq I_{rate} \quad (6)$$

In other words, when power supply apparatuses 10 for which Expression (6) holds are adjoined and connected in parallel to the load 70, then the overall operation of the power supply system 1 is maintained even if reverse current flows into one of the power supply apparatuses 10.

Figure 8:
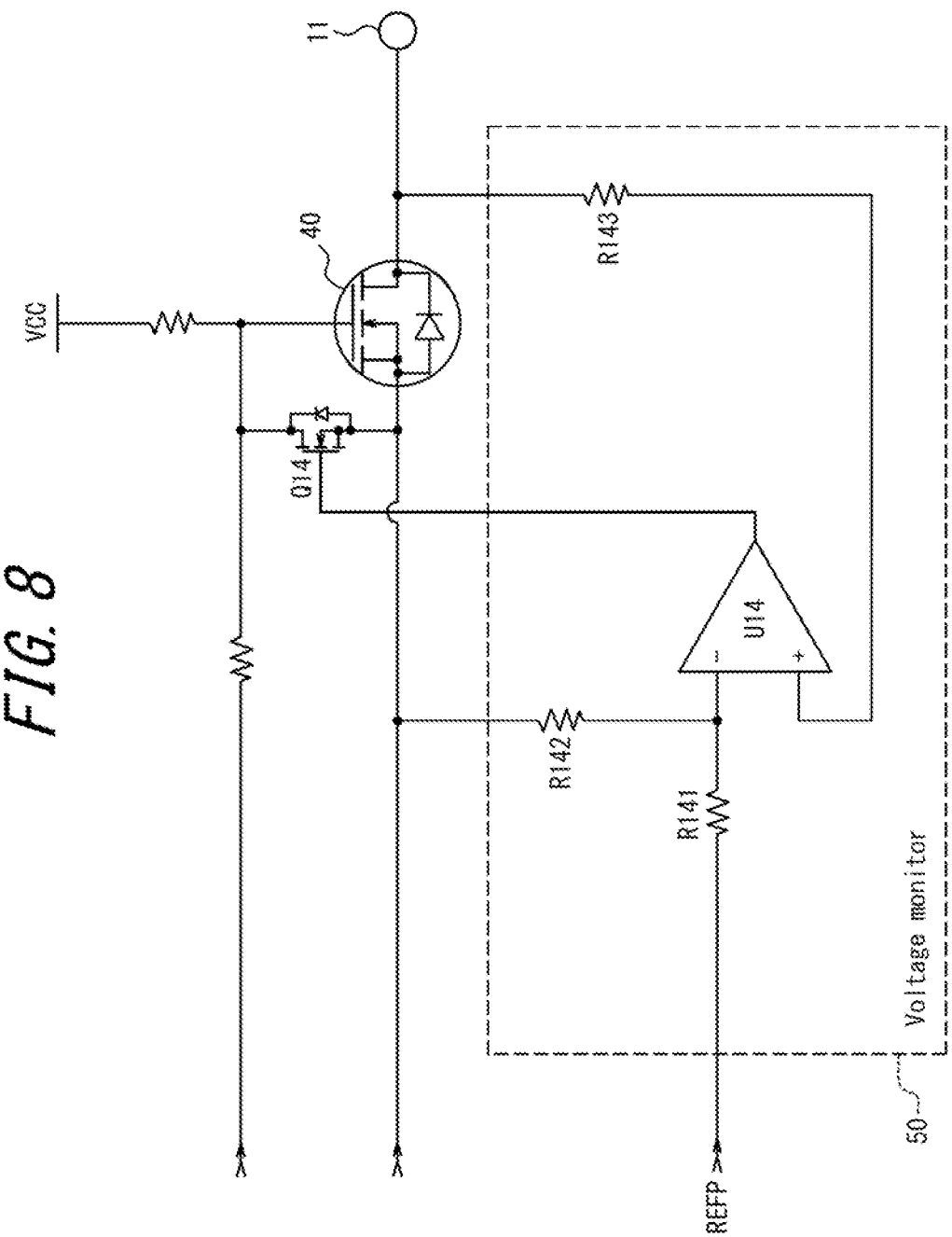
FIG. 8 is a block diagram illustrating an example configuration of a voltage monitor.

As illustrated in FIG. 8, the voltage monitor 50 includes an operational amplifier U14 and resistors R141, R142, R143. The voltage monitor 50 is connected to the switching element Q14. The switching element Q14 is assumed to be an n-channel MOSFET, but this example is not limiting. The source of the switching element Q14 is connected to the source of the FET 40. The drain of the switching element Q14 is connected to the gate of the FET 40. The gate of the switching element Q14 is connected to the output terminal of the operational amplifier U14. When the output terminal of the operational amplifier U14 outputs a larger voltage than a threshold voltage to the gate of the switching element Q14, the switching element Q14 turns on. When the switching element Q14 is on, the source and gate of the FET 40 short circuit. The voltage monitor 50 limits the reverse current by controlling the state of the switching element Q14.

The non-inverting input terminal of the operational amplifier U14 is connected to the drain of the FET 40 via the resistor R143. The voltage inputted to the non-inverting input terminal of the operational amplifier U14 is the voltage of the drain of the FET 40. The inverting input terminal of the operational amplifier U14 is connected to the source of the FET 40 via the resistor R142 and is connected to the cathode of the Zener diode REFP (see FIG. 5) via the resistor R141. The voltage inputted to the inverting input terminal of the operational amplifier U14 is the result of adding, to the voltage of the source of the FET 40, the voltage of the Zener diode REFP divided at the resistors R141, R142. The voltage of the Zener diode REFP divided at the resistors R141, R142 is also referred to as a monitoring offset voltage.

The operational amplifier U14 can detect the reverse current based on the voltage between the source and the gate of the FET 40. When the power supply apparatus 10 is operating normally, the load current $I_L$ flows from the source to the drain of the FET 40. In this case, the voltage of the source of the FET 40 is higher than the voltage of the drain. In other words, the voltage inputted to the inverting input terminal of the operational amplifier U14 becomes higher than the voltage inputted to the non-inverting input terminal. The voltage that the output terminal of the operational amplifier U14 outputs to the gate of the switching element Q14 becomes 0. Consequently, the switching element Q14 turns off.

If a short-circuit failure occurs inside the converter 20 and reverse current flows, the voltage of the source of the FET 40 becomes lower than the voltage of the drain. When the difference between the voltage of the drain and the voltage of the source of the FET 40 becomes larger than the voltage of the Zener diode REFP divided by the resistors R141, R142, the output terminal of the operational amplifier U14 outputs positive voltage to the gate of the switching element Q14. As a result of a larger voltage than the threshold voltage being inputted to the gate of the switching element Q14, the source and gate of the FET 40 short circuit. The FET 40 turns off due to the short circuiting of the source and gate of the FET 40. Consequently, the reverse current flowing to the FET 40 is cut off. When the internal voltage applied to the source side of the FET 40 reduces due to internal failure of the converter 20 or the like upon the reverse current being cut off at the FET 40, the FET 40 is maintained in the off state by the output voltage of the other power supply apparatus 10 at the drain side of the FET 40 being applied.

The operational amplifier U14 compares the voltage of the drain of the FET 40 with the sum of the voltage of the source of the FET 40 and the monitoring offset voltage and outputs a signal based on the result of comparison to the gate of the switching element Q14. The switching element Q14 controls the resistance between the source and gate of the FET 40 based on the signal inputted to the gate. In other words, the voltage monitor 50 inputs, to the gate of the FET 40, a signal based on the result of comparing the voltage of the drain of the FET 40 with the sum of the voltage of the source of the FET 40 and the monitoring offset voltage. The reverse current is consequently controlled.

A reverse current threshold $I_{Loff}$ at which the reverse current is cut off is expressed by Expression (7) below.

$$I_{Loff} = -REFP \times [R142/(R141+R142)]/R_{on} \quad (7)$$

The reverse current threshold $I_{Loff}$ is assumed to be a positive value when current flows from the source to the drain of the FET 40. $R_{on}$ represents the ON resistance of the FET 40.

If the FET 40 turns off due to noise or the like while the power supply apparatus 10 is operating normally, then the load current $I_L$ flowing in the FET 40 momentarily decreases. However, if $I_{Loff}$ is always a negative value regardless of circuit variation or the like, the FET 40 always turns back on.

If current at the reverse current threshold $I_{Loff}$ flows in one power supply apparatus 10, then the other power supply apparatus 10 needs to output a current yielded by combining the load current $I_L$ and the reverse current. An excessively large absolute value of $I_{Loff}$ causes the current yielded by combining the load current $I_L$ and the reverse current to exceed the OLP point. If the current outputted by the power supply apparatus 10 exceeds the OLP point, the power supply apparatus 10 reduces the output voltage $V_{out}$ with an overload protection function. In this case, the supply of power to the load 70 can no longer be continued. Accordingly, the sum of the absolute value of $I_{Loff}$ and the maximum load current needs to be limited to a current equal to or less than the OLP point of the power supply apparatus 10. This relationship is represented as Expression (8) below.

$$|I_{Loff}| + I_{Lmax} \leq I_{OLP2} \quad (8)$$

$I_{OLP2}$ represents the current at the OLP point.

If the sum of the absolute value of $I_{Loff}$ and the maximum load current is equal to or less than the OLP point of the power supply apparatus 10, then the power supply apparatus 10 in which reverse current is not flowing is not stopped by the overload protection function. Consequently, the power supply system 1 overall can continue to supply power to the load 70. In other words, when power supply apparatuses 10 for which Expression (8) holds are adjoined and connected in parallel to the load 70, then the overall operation of the power supply system 1 is maintained even if reverse current flows into one of the power supply apparatuses 10.

Normally, operations of the power supply apparatus 10 are guaranteed by the current output of the power supply apparatus 10 being limited to being equal to or less than the rated current. In Expression (8), however, output of current at the OLP point, which exceeds the rated current, is allowed. The reason why this configuration allows a current exceeding the rated current is that failure of the power supply apparatus 10 can be avoided by limiting the length of time that such current flows.

The length of time that current with a magnitude of $I_{Loff}$ flows is limited by the FET 40 turning off to cut off reverse current when reverse current in the power supply apparatus 10 exceeds $I_{Loff}$. In this way, output of current exceeding the rated current of the power supply apparatus 10 is permitted for a limited time.

The configuration combining the voltage monitor 50 and the switching element Q14 may be replaced with a synchronous rectification control IC.

The function for the voltage monitor 50 and the switching element Q14 to limit the reverse current and the function for the separation unit 34 to limit the reverse current can replace each other. Accordingly, the power supply apparatus 10 can limit the reverse current and improve reliability by including at least one of the configuration combining the voltage monitor 50 and the switching element Q14 and the configuration of the separation unit 34. The configuration combining the voltage monitor 50 and the switching element Q14 and the configuration of the separation unit 34 are also referred to as a reverse current limitation unit. The reverse current limit $I_{bk}$ and the reverse current threshold $I_{Loff}$ are also referred to as a reverse current reference limit.

When the reverse current is limited by the voltage monitor 50 and the switching element Q14, the FET 40 turns off. The loss in the FET 40 when a short-circuit failure occurs is therefore reduced or brought nearly to zero. The reduction of loss in the FET 40 reduces the probability of chain-reaction failure in the other power supply apparatus 10 connected in parallel to the load 70.

When the reverse current is limited by the separation unit 34, the variation in the limit on the reverse current can be reduced by a reduction in the variation of Zener voltage of the Zener diode REFP and in the variation of resistance of the resistors R131, R132.

The operational amplifier U14 sometimes includes a grounding unit to be grounded to the ground point 80. When the grounding unit of the operational amplifier U14 is grounded, the operational amplifier U14 forms a bridge between the path for outputting the load current $I_L$ of the power supply apparatus 10 and the ground point 80. Besides the operational amplifier U14, other circuit components included in the current detector 30 might form a bridge between the path for outputting the load current $I_L$ of the power supply apparatus 10 and the ground point 80. A component that forms a bridge between the path for outputting the load current $I_L$ of the power supply apparatus 10 and the ground point 80 is also referred to as a bridge component. A path that forms a bridge between the path for outputting the load current $I_L$ of the power supply apparatus 10 and the ground point 80 is also referred to as a bridge path.

When a bridge component suffers a short-circuit failure, short-circuit current flows in the bridge path. In the example in FIG. 8, for example, if the grounding unit and the non-inverting input terminal or the inverting input terminal of the operational amplifier U14 short circuit due to an internal failure or the like of the operational amplifier U14, then the path for outputting the load current $I_L$ of the power supply apparatus 10 and the ground point 80 short circuit. Consequently, short-circuit current flows from the path for outputting the load current $I_L$ to the ground point 80.

As a result of the resistor R143 being inserted in series between the non-inverting input terminal of the operational amplifier U14 and the path over which the load current $I_L$ flows, the resistor R143 limits the short-circuit current passing through the non-inverting input terminal. As a result of the resistor R142 being inserted in series between the inverting input terminal of the operational amplifier U14 and the path over which the load current $I_L$ flows, the resistor R142 limits the short-circuit current passing through the inverting input terminal. A resistance element may be connected in series in the bridge path not only in the operational amplifier U14 but also in any other bridge component for the resistance element to limit the short-circuit current due to short-circuit failure of the bridge component.

A resistance element connected in series in the bridge path facilitates continued operations of the power supply apparatus 10. Consequently, the reliability of the power supply apparatus 10 increases.

As described above, the reliability of the power supply system 1 increases when the power supply system 1 is configured by connecting power supply apparatuses 10 according to the present embodiment in parallel to the load 70. The power supply apparatus 10 according to the present embodiment can achieve various functions for improving reliability without use of an MCU. Apparatus costs can be reduced by the omission of an MCU.

OTHER EMBODIMENTS

Figure 9:
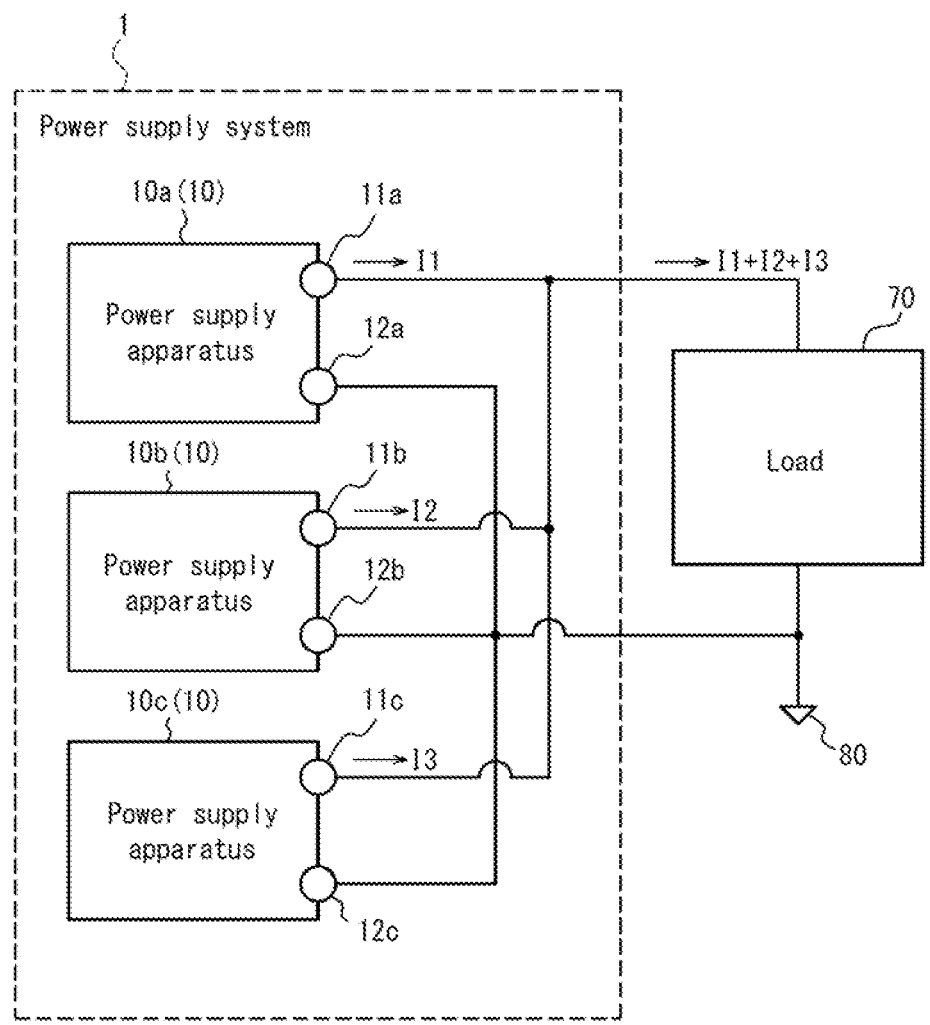
FIG. 9 is a block diagram illustrating an example configuration of a power supply system according to another embodiment.

As illustrated in FIG. 9, a power supply system 1 according to another embodiment includes power supply apparatuses 10a, 10b, 10c. The power supply apparatuses 10a, 10b are assumed to be the same as the power supply apparatuses 10a, 10b illustrated in FIG. 2. The power supply apparatuses 10a, 10b, 10c are referred to as a power supply apparatus 10 when no distinction therebetween is necessary.

The power supply apparatus 10c includes an output terminal 11c and a ground terminal 12c. The output terminals 11a, 11b, 11c are referred to as an output terminal 11 when no distinction therebetween is necessary. The ground terminals 12a, 12b, 12c are referred to as a ground terminal 12 when no distinction therebetween is necessary.

The power supply apparatuses 10a, 10b, 10c are connected to a load 70 in parallel. One terminal of the load 70 is connected to the output terminals 11a, 11b, 11c. The other terminal of the load 70 is connected to a ground point 80 and to the ground terminals 12a, 12b, 12c. The current outputted by the power supply apparatus 10a from the output terminal 11a is represented as I1. The current outputted by the power supply apparatus 10b from the output terminal 11b is represented as I2. The current outputted by the power supply apparatus 10c from the output terminal 11c is represented as I3. The power supply system 1 supplies the load 70 with the current yielded by combining the current outputted by the power supply apparatus 10a from the output terminal 11a, the current outputted by the power supply apparatus 10b from the output terminal 11b, and the current outputted by the power supply apparatus 10c from the output terminal 11c. In other words, the power supply system 1 provides the current represented as I1+I2+I3 to the load 70. The current supplied to the load 70 may flow to the ground point 80 or may return to the power supply apparatuses 10a, 10b, 10c through the ground terminals 12a, 12b, 12c.

When the three power supply apparatuses 10 are connected in parallel to the load 70, and one power supply apparatus 10 fails, then another power supply apparatus 10 supplies power to the load 70. The power supply system 1 overall thereby continues to supply power to the load 70. The current outputted by each power supply apparatus 10 when all three power supply apparatuses 10 are operating normally may be controlled to be ⅓ of the current required by the load 70. The current required by the load 70 is thereby supplied from the three power supply apparatuses 10 in a balanced manner.

Figure 10:
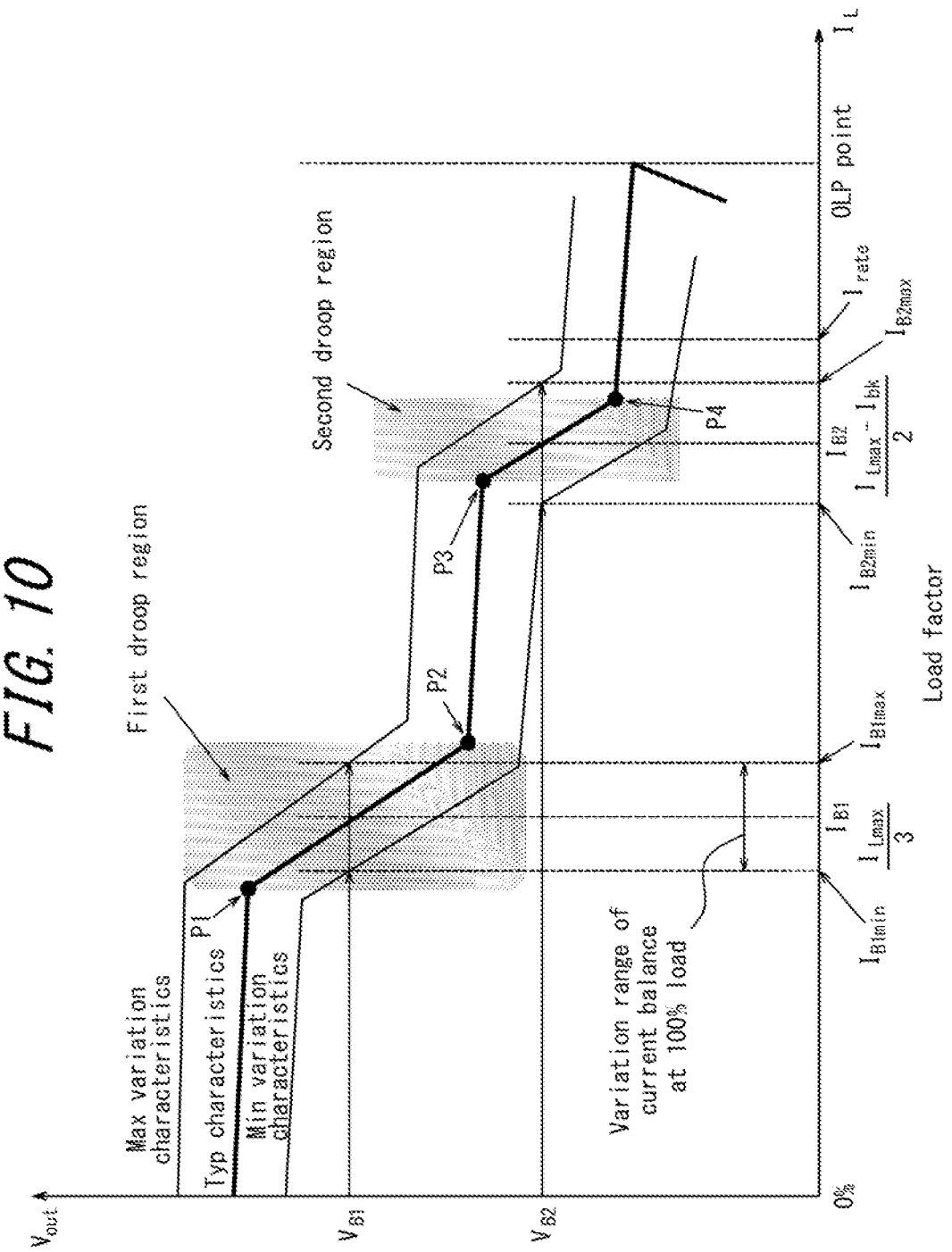
FIG. 10 is a graph illustrating an example of a droop characteristic of a power supply apparatus according to another embodiment.

The relationship between the load current $I_L$ and the output voltage $V_{out}$ in the power supply apparatus 10 according to the present embodiment is, for example, determined as in the graph of FIG. 10. The horizontal axis represents the load current $I_L$, and the vertical axis represents the output voltage $V_{out}$ in the graph in FIG. 10. The plot labeled Typ characteristics represents typical current-voltage characteristics based on a configuration according to the present embodiment. The plots labeled Max variation characteristics and Min variation characteristics represent the assumed upper limit and lower limit on current-voltage characteristics within the possible range of variation exhibited by parameters such as FETs or operational amplifiers in the configuration according to the present embodiment. The plot labeled Typ characteristics is assumed below to represent the current-voltage characteristics according to the present embodiment.

In FIG. 10, the slope of the plot changes suddenly at four locations. The point at which the slope first changes suddenly after the load current $I_L$ starts to increase from zero is represented as P1. The load current $I_L$ at P1 corresponds to a first threshold current. The point at which the load current $I_L$ becomes a larger value than the first threshold current and the slope suddenly changes for the second time is represented as P2. The load current $I_L$ at P2 corresponds to a second threshold current. The point at which the load current $I_L$ becomes a larger value than the second threshold current and the slope suddenly changes for the third time is represented as P3. The load current $I_L$ at P3 corresponds to a third threshold current. The point at which the load current $I_L$ becomes a larger value than the third threshold current and the slope suddenly changes for the fourth time is represented as P4. The load current $I_L$ at P4 corresponds to a fourth threshold current.

The horizontal axis of the graph in FIG. 10 is divided into a plurality of sections with the first threshold current through the fourth threshold current as boundaries. The section in which the current is larger than the first threshold current and smaller than the second threshold current is the section that identifies a first droop region. This section is referred to as the first current section. The section in which the current is smaller than the first threshold current is referred to as the second current section. The section in which the current is larger than the second threshold current and smaller than the third threshold current is referred to as the third current section. The section in which the current is larger than the third threshold current and smaller than the fourth threshold current is the section that identifies a second droop region. This section is referred to as the fourth current section. The section in which the current is larger than the fourth threshold current is referred to as the fifth current section. The second current section includes a current that is smaller than the current included in the first current section. The third current section includes a current that is larger than the current included in the first current section and smaller than the current included in the fourth current section. The fifth current section includes a current that is larger than the current included in the fourth current section. The droop rate when the load current $I_L$ is included in the first current section can be considered greater than the droop rate when the load current $I_L$ is included in each of the second current section and the third current section. The droop rate when the load current $I_L$ is included in the fourth current section can be considered greater than the droop rate when the load current $I_L$ is included in each of the third current section and the fifth current section.

When the current outputted by each power supply apparatus 10 is balanced with respect to the maximum load current $I_{Lmax}$ of the load 70, the current outputted by each power supply apparatus 10 is referred to as an ideal balanced current $I_{B1}$. The first threshold current is set to a smaller value than $I_{B1}$. The second threshold current is set to a larger value than $I_{B1}$. $I_{B1}$ is represented by Expression (9) below.

$$I_{B1}=I_{Lmax}/3 \qquad (9)$$

$I_{B1max}$ and $I_{B1min}$ are indicated on the horizontal axis of the graph in FIG. 10. $I_{B1max}$ represents the current flowing at the Max variation characteristics, and $I_{B1min}$ represents the current flowing at the Min variation characteristics, when $V_{out}=V_{B1}$. $V_{B1}$ represents the voltage outputted by the output terminal of the operational amplifier U13B in the droop characteristic controller 32 when the load currents $I_L$ of the three power supply apparatuses 10 are balanced. The difference between $I_{B1max}$ and $I_{B1min}$ represents the variation of the load factor that can occur when the load currents $I_L$ of the three power supply apparatuses 10 are balanced. In other words, as the difference between $I_{B1max}$ and $I_{B1min}$ is smaller, the variation in the load factor of the three power supply apparatuses 10 is smaller.

If one of the three power supply apparatuses 10 fails, and the current outputted by the two operating power supply apparatuses 10 is balanced, then the current outputted by each of the two power supply apparatuses 10 is referred to as an ideal balanced current $I_{B2}$. The third threshold current is set to a smaller value than $I_{B2}$. The fourth threshold current is set to a larger value than $I_{B2}$. Expression (10) below holds when the maximum reverse current that can flow to one power supply apparatus 10 that has failed is represented by the reverse current limit $I_{bk}$.

$$I_{B2}=(-I_{bk}+I_{Lmax})/2 \qquad (10)$$

$I_{B2max}$ and $I_{B2}$ min are indicated on the horizontal axis of the graph in FIG. 10. $I_{B2max}$ represents the current flowing at the Max variation characteristics, and $I_{B2min}$ represents the current flowing at the Min variation characteristics, when $V_{out}=V_{B2}$. $V_{B2}$ represents the voltage outputted by the output terminal of the operational amplifier U13B in the droop characteristic controller 32 when one power supply apparatus 10 has failed and the load currents $I_L$ of the other two power supply apparatuses 10 are balanced. The difference between $I_{B2max}$ and $I_{B2}$ min represents the variation of the load factor that can occur when the load currents $I_L$ of the two power supply apparatuses 10 are balanced. In other words, as the difference between $I_{B2max}$ and $I_{B2min}$ is smaller, the variation in the load factor of the two power supply apparatuses 10 is smaller.

$I_{B2max}$ represents the maximum value of the load current $I_L$ that can flow in one of the two power supply apparatuses 10 whose load currents $I_L$ are balanced. $I_{B2max}$ is larger than $I_{B2}$. $I_{B2max}$ is required to be equal to or less than the rated current $I_{rate}$. Therefore, Expression (11) below holds.

$$I_{rate} \geq I_{B2max} > (-I_{bk}+I_{Lmax})/2 \qquad (11)$$

As a result of the current-voltage characteristics of the power supply apparatuses 10 being set as in the graph in FIG. 10, the load currents $I_L$ of the operating power supply apparatuses 10 are easier to balance, both when all three power supply apparatuses 10 are operating and when one power supply apparatus 10 has failed. Consequently, the reliability of the power supply system 1 increases.

In more general terms, the power supply system 1 may include (N+1) power supply apparatuses 10. Here, N is a natural number and is two or more. In this case, the above-described Expressions (9) to (11) are generalized as Expressions (12) to (14) below.

$$I_{B1}=I_{Lmax}/(N+1) \tag{12}$$

$$I_{B2}=(-I_{bk}+I_{Lmax})/N \tag{13}$$

$$I_{rate} \geq I_{B2max} > (-I_{bk}+I_{Lmax})/N \tag{14}$$

(N+1) is referred to as a first predetermined number. N is referred to as a second predetermined number. The second predetermined number is the result of subtracting one from the first predetermined number. Based on Expression (12), $I_{B1}$ is represented as the product of the maximum load current $I_{Lmax}$ and the inverse of the first predetermined number. Based on Expression (13), $I_{B2}$ is represented as the product of (i) the sum of the maximum load current $I_{Lmax}$ and the absolute value of the reverse current limit $I_{bk}$ and (ii) the inverse of the second predetermined number. When the reverse current limit $I_{bk}$ is sufficiently smaller than the maximum load current $I_{Lmax}$, Expression (13) may be replaced by Expression (15) below.

$$I_{B2}=I_{Lmax}/N \tag{15}$$

In this case, $I_{B2}$ is represented as the product of the maximum load current $I_{Lmax}$ and the inverse of the second predetermined number.

As a result of Expression (12), Expression (13) or (15), and Expression (14) holding, the load currents $I_L$ of N power supply apparatuses 10 are easier to balance, both when (N+1) power supply apparatuses 10 are all operating and when one power supply apparatus 10 has failed. Consequently, the reliability of the power supply system 1 increases.

When the power supply apparatus 10 supplies negative power output, a p-channel MOSFET may be used as the FET 40.

In an embodiment, the current detection unit is connected in series to the path over which the load current $I_L$ outputted by the converter 20 flows towards the load 70. In another embodiment in which the load current $I_L$ outputted by the converter 20 returns to the converter 20 over an independent path, the current detection unit may be connected in series to the path over which the load current $I_L$ returns from the load 70 to the converter 20. This allows an operational amplifier that is not rail-to-rail to be used as the operational amplifier that acquires the detection result of the current detection unit in the current detector 30.

Although embodiments of the present disclosure have been described through drawings and examples, it is to be noted that various changes and modifications will be apparent to those skilled in the art on the basis of the present disclosure. Therefore, such changes and modifications are to be understood as included within the scope of the present disclosure. For example, the functions or the like included in the various components or steps may be reordered in any logically consistent way. Furthermore, components or steps may be combined into one or divided.

The invention claimed is:

1. A power supply system comprising:
   at least two power supply apparatuses configured to supply current to a load;
   wherein each power supply apparatus comprises:
   a converter configured to supply current to the load;
   a FET connected in series between the converter and the load;
   a current detection unit configured to detect current flowing between the converter and the load; and
   a droop characteristic controller configured to cause output voltage of the converter to droop at a droop rate determined based on a magnitude of load current flowing from the converter towards the load;
   wherein the droop rate when the load current is included in a first current section is greater than the droop rate when the load current is included in each of a second current section and a third current section;
   wherein the second current section includes current that is smaller than current included in the first current section; and
   wherein the third current section includes current that is larger than the current included in the first current section.

2. The power supply system of claim 1, wherein each power supply apparatus further comprises a reverse current limitation unit configured to limit, based on a reverse current reference limit, a reverse current flowing from the load towards the converter.

3. The power supply system of claim 2, wherein the reverse current limitation unit comprises a separation unit configured to input, to a gate of the FET, a signal based on a result of comparing the reverse current as detected by the current detection unit with the reverse current reference limit.

4. The power supply system of claim 2, wherein the reverse current limitation unit includes a voltage monitor configured to input, to a gate of the FET, a signal based on a result of comparing a potential of a drain of the FET with a sum of a potential of a source of the FET and a monitoring offset voltage.

5. The power supply system of claim 3, wherein the reverse current limitation unit includes a voltage monitor configured to input, to a gate of the FET, a signal based on a result of comparing a potential of a drain of the FET with a sum of a potential of a source of the FET and a monitoring offset voltage.

6. The power supply system of claim 2,
   wherein the converter has a rated current; and
   wherein the rated current is set to a larger value than a sum of a maximum load current and the reverse current reference limit.

7. The power supply system of claim 3,
   wherein the converter has a rated current; and
   wherein the rated current is set to a larger value than a sum of a maximum load current and the reverse current reference limit.

8. The power supply system of claim 4,
   wherein the converter has a rated current; and
   wherein the rated current is set to a larger value than a sum of a maximum load current and the reverse current reference limit.

9. The power supply system of claim 5,
   wherein the converter has a rated current; and
   wherein the rated current is set to a larger value than a sum of a maximum load current and the reverse current reference limit.

10. The power supply system of claim 1, wherein a resistance element is connected in series in at least one of paths short-circuiting between a current path from the converter towards the load and a ground point.

11. The power supply system of claim 1, wherein the first current section includes a current that is 50% of a maximum load current.

12. The power supply system of claim 1,
   wherein the droop rate when the load current is included in a fourth current section is greater than the droop rate when the load current is included in each of a fifth current section and the third current section;

wherein the fourth current section includes current that is larger than the current included in the third current section;

wherein the fifth current section includes current that is larger than the current included in the fourth current section;

wherein the first current section includes current represented by a product of a maximum load current and an inverse of a first predetermined number; and wherein the fourth current section includes current represented by a product of the maximum load current and an inverse of a second predetermined number yielded by subtracting one from the first predetermined number.

13. A power supply apparatus comprising:
a converter configured to supply current to a load;
a FET connected in series between the converter and the load;
a current detection unit configured to detect current flowing between the converter and the load; and
a droop characteristic controller configured to cause output voltage of the converter to droop at a droop rate determined based on a magnitude of load current flowing from the converter towards the load;
wherein the droop rate when the load current is included in a first current section is greater than the droop rate when the load current is included in each of a second current section and a third current section;
wherein the second current section includes current that is smaller than current included in the first current section; and
wherein the third current section includes current that is larger than the current included in the first current section.

14. The power supply apparatus of claim 13, further comprising a reverse current limitation unit configured to limit, based on a reverse current reference limit, a reverse current flowing from the load towards the converter.

15. The power supply apparatus of claim 14, wherein the reverse current limitation unit comprises a separation unit configured to input, to a gate of the FET, a signal based on a result of comparing the reverse current as detected by the current detection unit with the reverse current reference limit.

16. The power supply apparatus of claim 14, wherein the reverse current limitation unit includes a voltage monitor configured to input, to a gate of the FET, a signal based on a result of comparing a potential of a drain of the FET with a sum of a potential of a source of the FET and a monitoring offset voltage.

17. The power supply apparatus of claim 14,
wherein the converter has a rated current; and
wherein the rated current is set to a larger value than a sum of a maximum load current and the reverse current reference limit.

18. The power supply apparatus of claim 13, wherein a resistance element is connected in series in at least one of paths short-circuiting between a current path from the converter towards the load and a ground point.

19. The power supply apparatus of claim 13, wherein the first current section includes a current that is 50% of a maximum load current.

20. The power supply apparatus of claim 13,
wherein the droop rate when the load current is included in a fourth current section is greater than the droop rate when the load current is included in each of a fifth current section and the third current section;
wherein the fourth current section includes current that is larger than the current included in the third current section;
wherein the fifth current section includes current that is larger than the current included in the fourth current section;
wherein the first current section includes current represented by a product of a maximum load current and an inverse of a first predetermined number; and
wherein the fourth current section includes current represented by a product of the maximum load current and an inverse of a second predetermined number yielded by subtracting one from the first predetermined number.

* * * * *